(12) United States Patent
Presby

(10) Patent No.: US 10,576,863 B2
(45) Date of Patent: Mar. 3, 2020

(54) LOADING/UNLOADING DEVICE FOR A DELIVERY VEHICLE

(71) Applicant: PRESBY PATENT TRUST, Whitefield, NH (US)

(72) Inventor: David William Presby, Sugar Hill, NH (US)

( * ) Notice: Subject to any disclaimer, the term of this patent is extended or adjusted under 35 U.S.C. 154(b) by 74 days.

(21) Appl. No.: 15/556,860

(22) PCT Filed: Mar. 10, 2016

(86) PCT No.: PCT/US2016/021745
§ 371 (c)(1),
(2) Date: Sep. 8, 2017

(87) PCT Pub. No.: WO2016/145178
PCT Pub. Date: Sep. 15, 2016

(65) Prior Publication Data
US 2018/0043814 A1 Feb. 15, 2018

Related U.S. Application Data

(60) Provisional application No. 62/130,752, filed on Mar. 10, 2015.

(51) Int. Cl.
B60P 1/44 (2006.01)
(52) U.S. Cl.
CPC .................. B60P 1/4414 (2013.01)
(58) Field of Classification Search
CPC ......... B60P 1/4414; B60P 1/431; B60P 1/445; B60P 1/4471
See application file for complete search history.

(56) References Cited

U.S. PATENT DOCUMENTS 2,732,960 A * 1/1956 Nilson ................. B60P 1/4414
414/549
3,721,355 A * 3/1973 Irving .................... B60P 1/445
414/549

(Continued)

FOREIGN PATENT DOCUMENTS

GB    2 291 396 A    1/1996

OTHER PUBLICATIONS

Bullen, Donovan, "Israeli Tow-Truck," (Posted Jan. 18, 2011), Retrieved from https://www.youtube.com/watch?v=brOGiCsSOvU, Screenshots from video, 3 pgs.

(Continued)

Primary Examiner — Kaitlin S Joerger
(74) Attorney, Agent, or Firm — Davis & Bujold PLLC; Michael J. Bujold

(57) ABSTRACT

A loading/unloading device for attachment to a delivery vehicle to facilitate at least one of load and unloading of the delivery vehicle. The loading/unloading device comprises a fixed base member for attachment to the delivery vehicle. A movable base member is supported and axially movable, by a first drive, with respect to the fixed base member. A first end of a lifting arm is pivotably connected to a first end of the movable base member, and the lifting arm is pivotable mounted with respect to the movable base member by a second drive to facilitate pivoting movement of the lifting arm relative to the movable base member. A first end of a support arm is pivotably connected to a second end of the lifting arm, and the support arm is pivotably mounted with respect to the lifting arm to facilitate loading and unloading of the delivery vehicle.

21 Claims, 31 Drawing Sheets

(56) References Cited

U.S. PATENT DOCUMENTS

| | | | | |
|---|---|---|---|---|
| 4,124,099 A * | 11/1978 | Dudynskyj | ........... | B60P 1/4414 280/166 |
| 4,579,503 A * | 4/1986 | Disque | ................... | B60P 1/445 414/546 |
| 4,836,736 A * | 6/1989 | Neagu | .................... | B60P 1/445 414/557 |
| 5,118,246 A * | 6/1992 | Saussard | ................ | B60P 1/445 414/557 |
| 5,253,973 A * | 10/1993 | Fretwell | ................. | B60P 1/445 414/541 |
| 5,556,250 A * | 9/1996 | Fretwell | ................. | B60P 1/445 414/549 |
| 5,785,375 A * | 7/1998 | Alexander | ............... | B60J 7/145 296/108 |
| 6,435,804 B1 * | 8/2002 | Hutchins | .............. | B60P 1/4414 187/200 |
| 6,558,106 B2 * | 5/2003 | Sardonico | ............... | B60P 1/445 254/10 R |
| 6,739,825 B2 * | 5/2004 | Beck | ..................... | B60P 1/4442 414/549 |
| 7,033,128 B2 * | 4/2006 | Poindexter | ................ | B60P 1/16 414/522 |
| 7,648,324 B1 * | 1/2010 | Jensen | ................... | B60P 1/445 414/549 |
| 7,762,756 B1 * | 7/2010 | Ablabutyan | .......... | B60P 1/4485 414/401 |
| 8,505,141 B1 * | 8/2013 | Morris | .................. | A61G 3/061 14/71.1 |
| 8,534,732 B2 | 9/2013 | Bourgraf et al. | | |
| 8,821,103 B1 * | 9/2014 | Matthews | ................. | B60P 3/36 414/558 |
| 9,095,482 B2 * | 8/2015 | Gressett | .................. | A61G 3/062 |
| 9,545,869 B2 * | 1/2017 | Eidsmore | ............. | B60P 1/6409 |
| 9,603,760 B2 * | 3/2017 | Beck | ...................... | A61G 3/062 |
| 10,035,447 B2 * | 7/2018 | Miles | .................... | B60P 1/4414 |
| 10,220,759 B2 * | 3/2019 | Ablabutyan | ............. | B60P 1/44 |
| 2002/0114688 A1 * | 8/2002 | Poindexter | ................ | B60P 1/16 414/477 |
| 2002/0136625 A1 * | 9/2002 | Namgung | ............. | B60P 1/4414 414/563 |
| 2005/0036867 A1 | 2/2005 | Dyck | | |
| 2005/0186057 A1 * | 8/2005 | Reicks | .................... | B60P 1/445 414/556 |
| 2006/0051191 A1 * | 3/2006 | Dupuy | ................. | B60P 1/4457 414/522 |
| 2007/0048116 A1 * | 3/2007 | Friedrich | ................ | B60P 1/445 414/545 |
| 2011/0229294 A1 * | 9/2011 | Gale | ....................... | B60P 1/445 414/558 |
| 2013/0004276 A1 * | 1/2013 | Bark | ...................... | B60P 1/445 414/558 |

OTHER PUBLICATIONS

Grown Men Stuff, "This Is How They Tow Vehicles in Europe." (Posted Apr. 5, 2017), Retrieved from https://www.facebook.com/grownmenstuff/videos/1880364848880067/, Screenshots from video, 3 pgs.

* cited by examiner

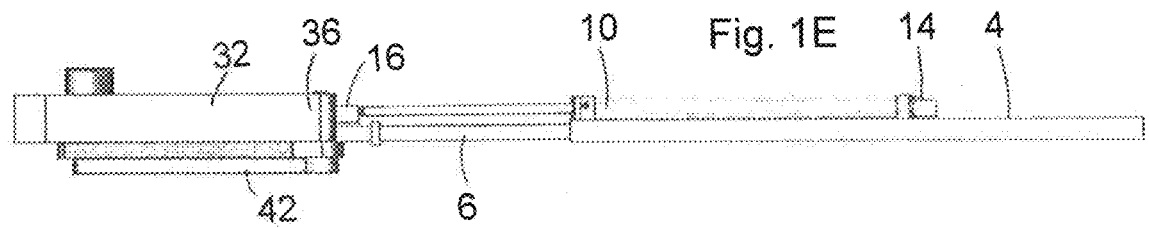
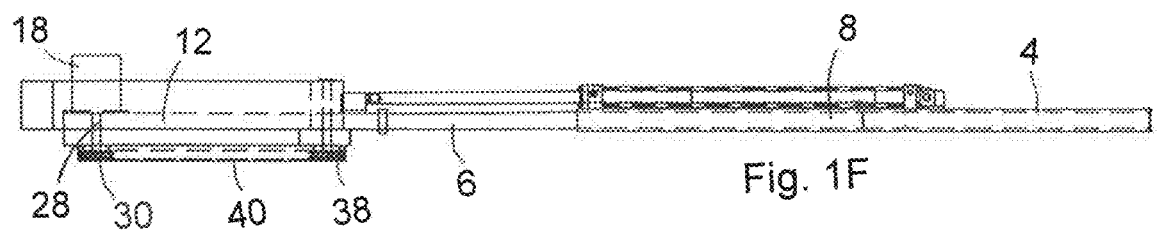
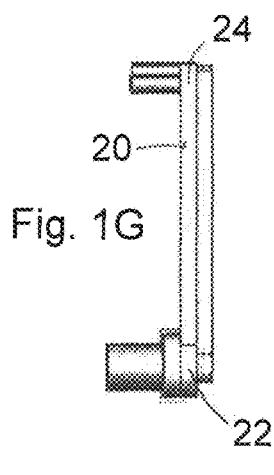
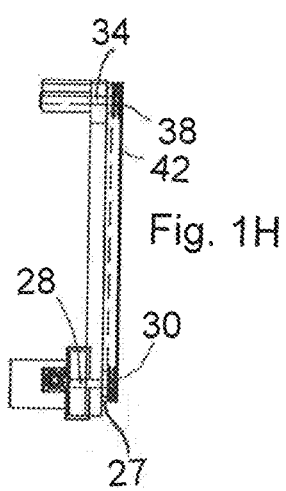
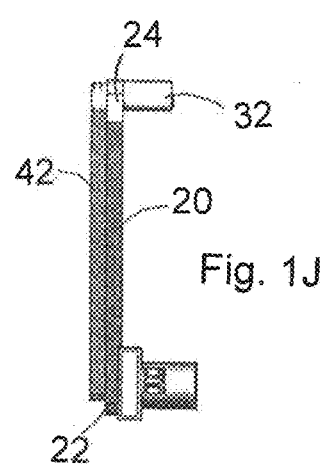
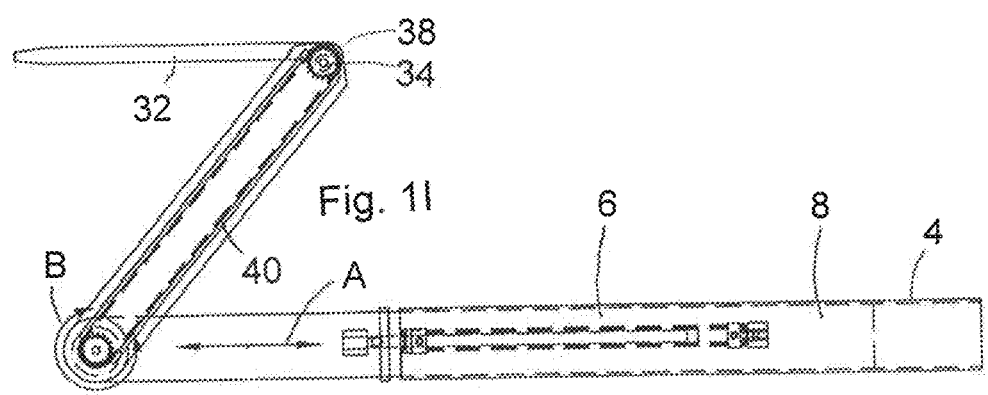

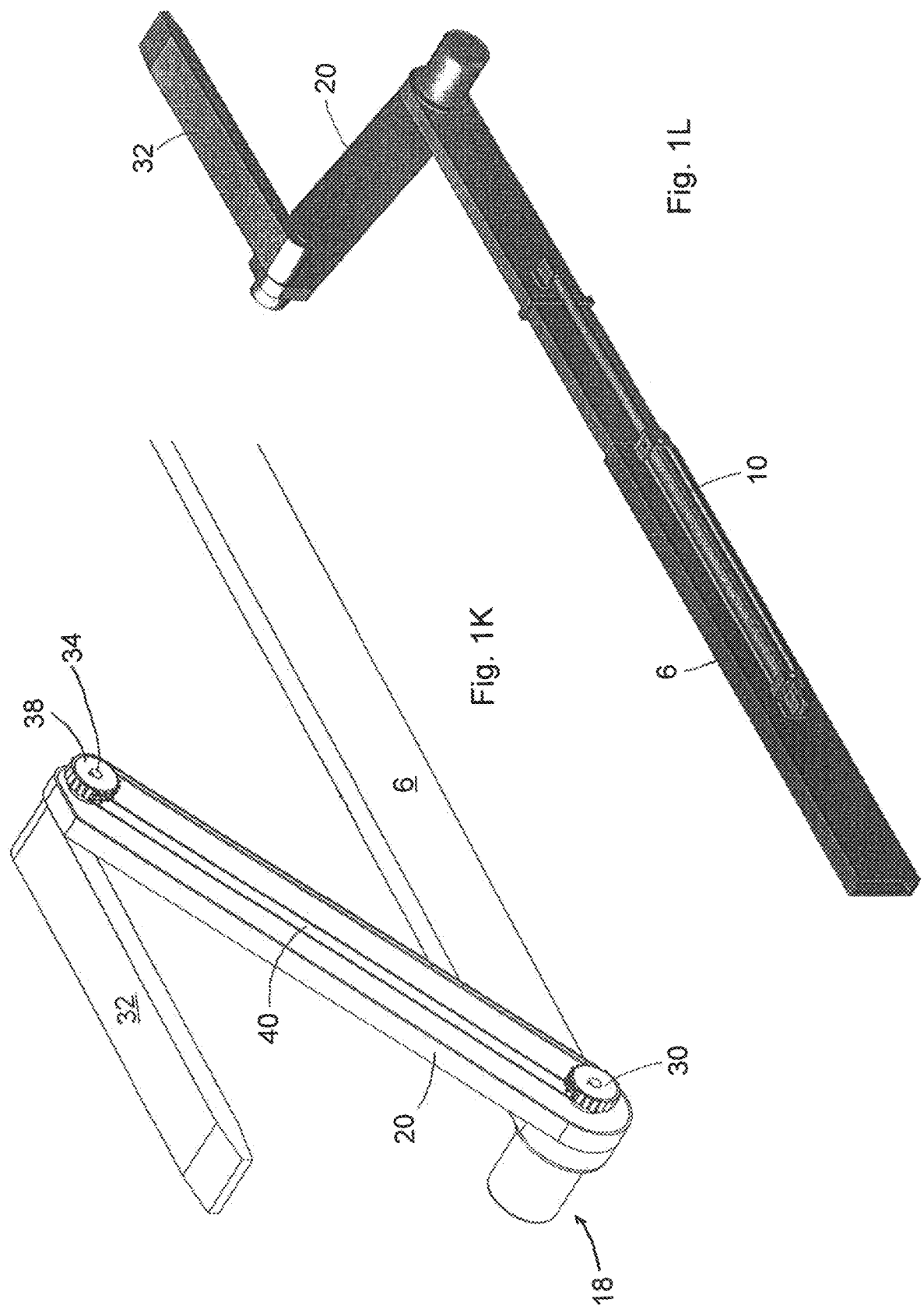

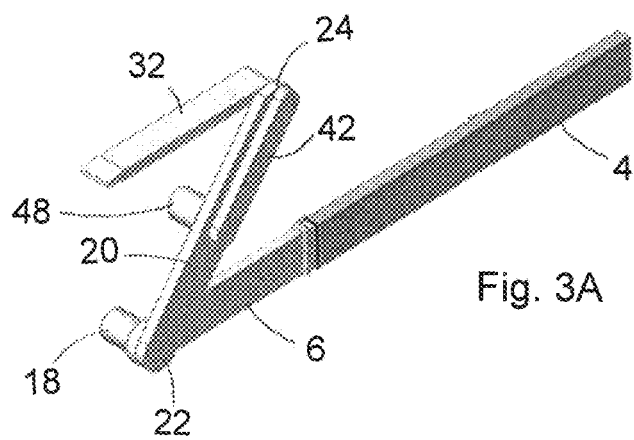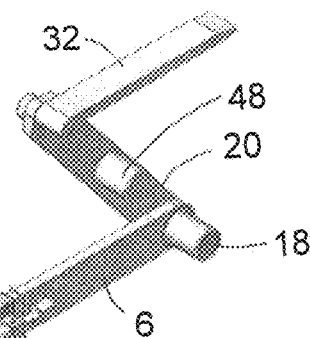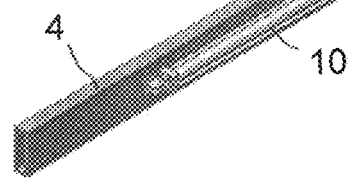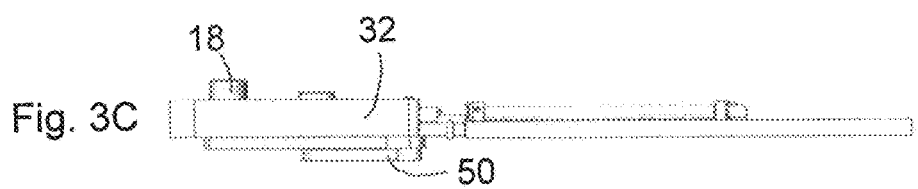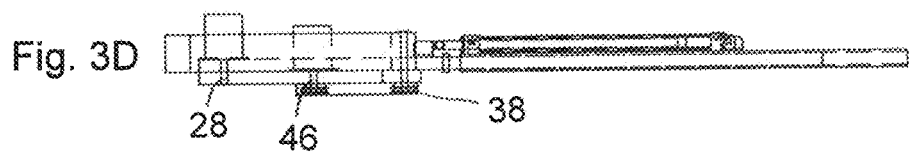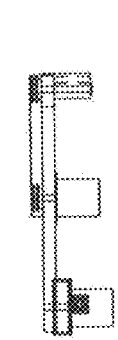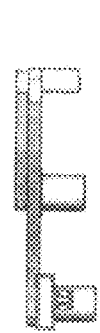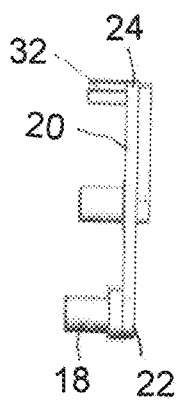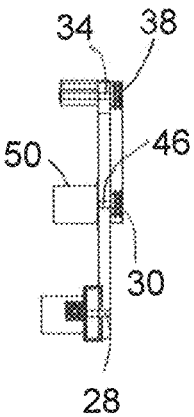
Fig. 3A  Fig. 3B  Fig. 3C  Fig. 3D  Fig. 3E  Fig. 3F  Fig. 3G  Fig. 3H

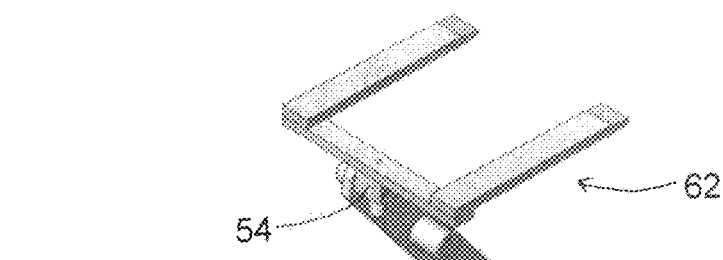
Fig. 6A
Fig. 6B
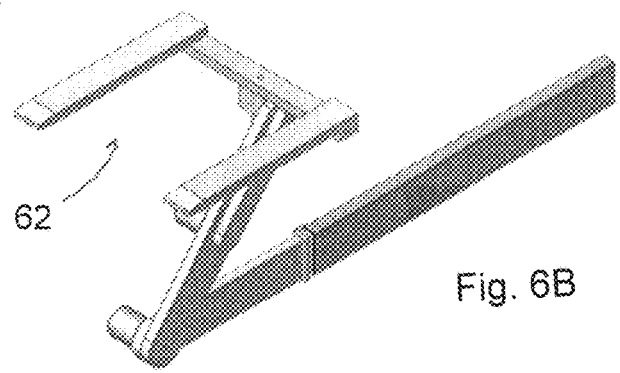
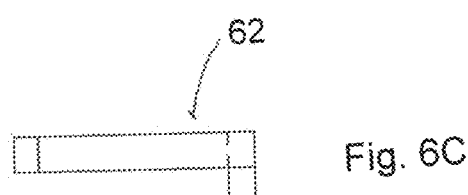
Fig. 6C
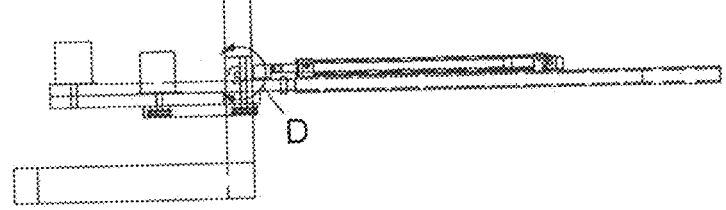
Fig. 6D
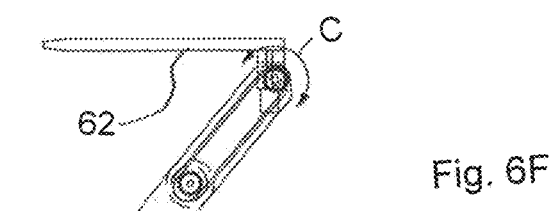
Fig. 6F
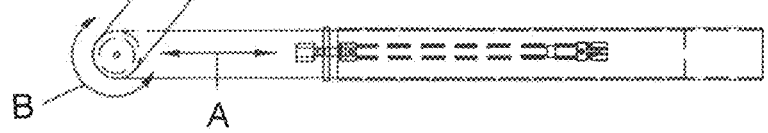
Fig. 6G
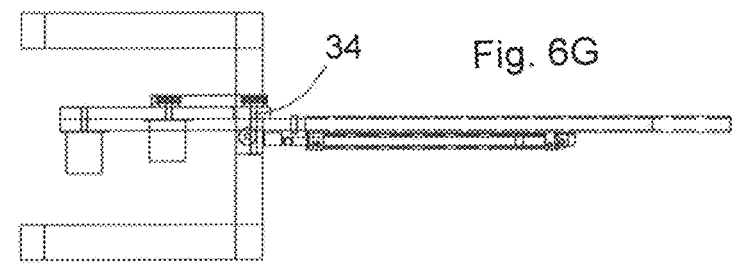
Fig. 6E

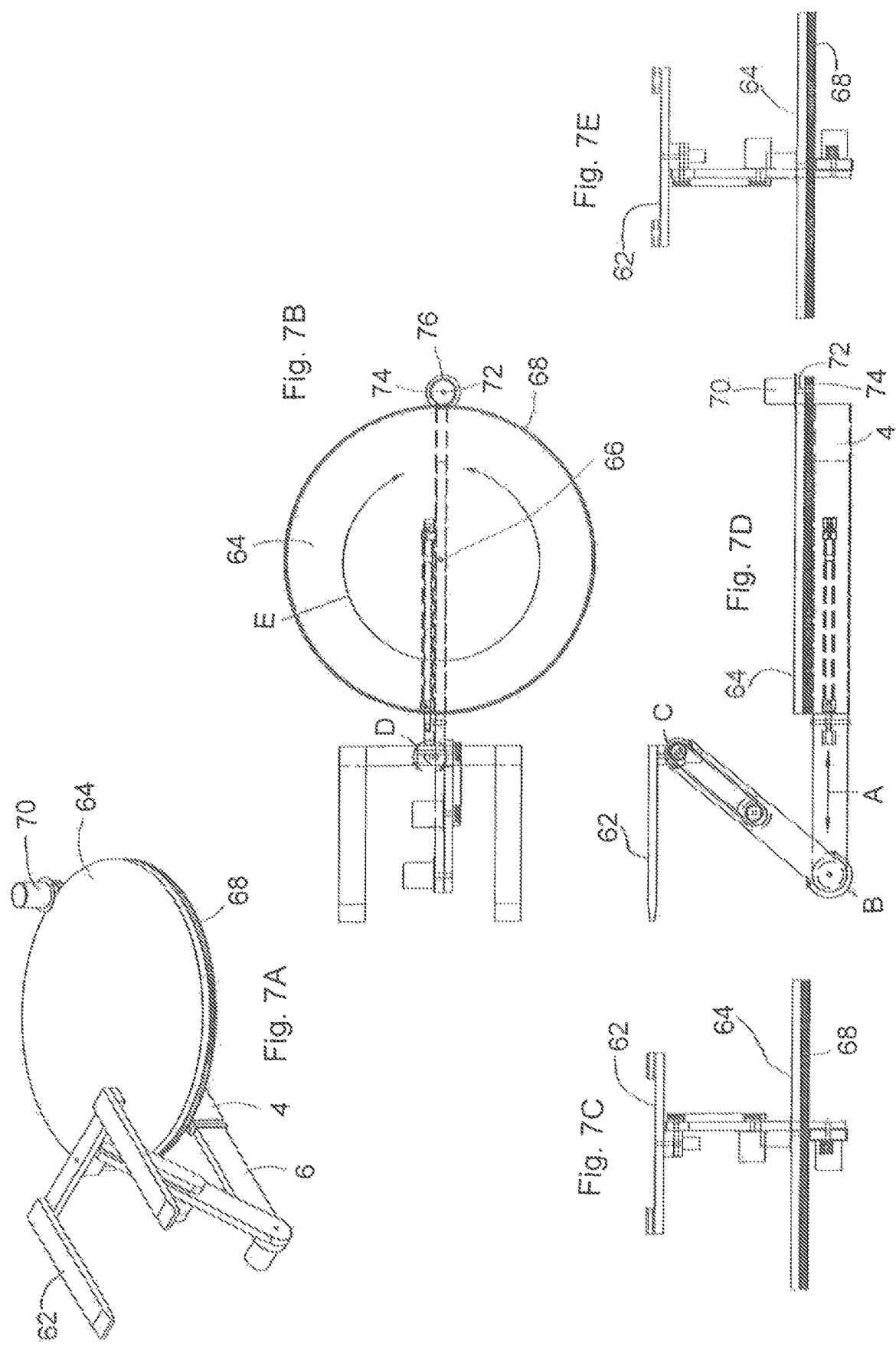

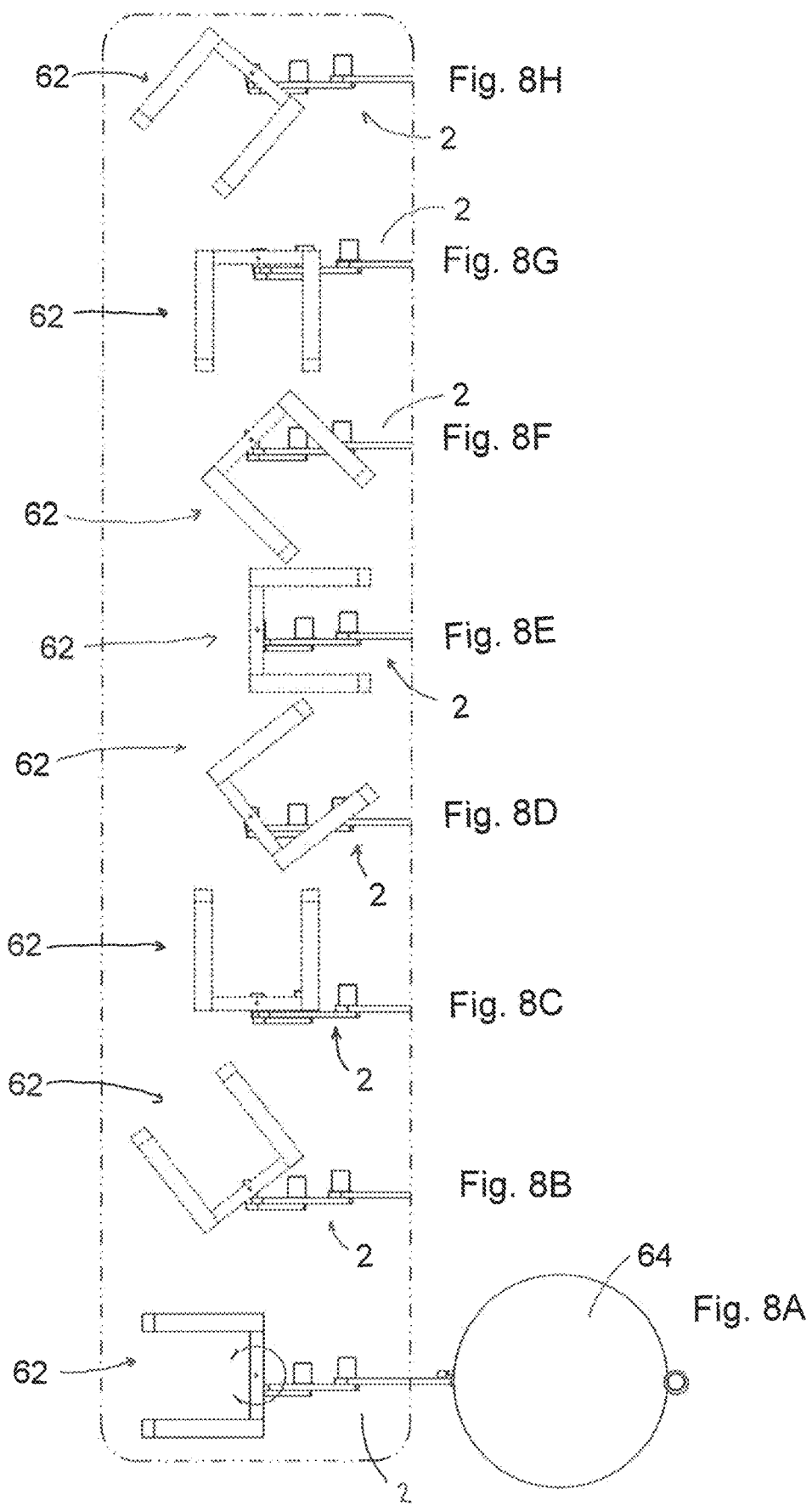

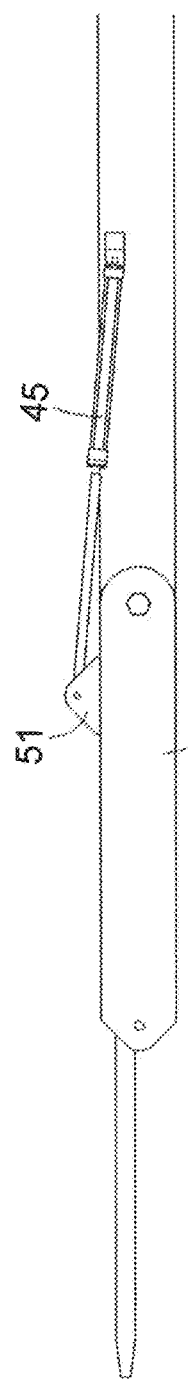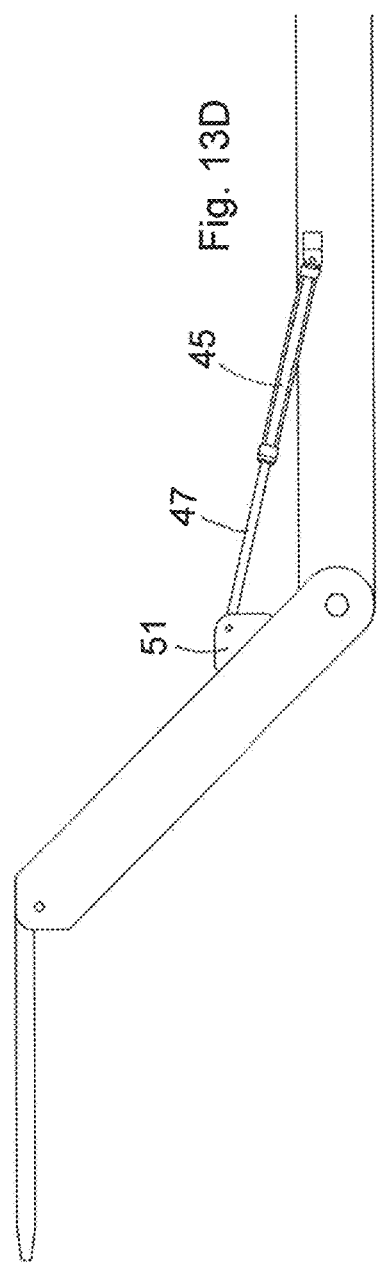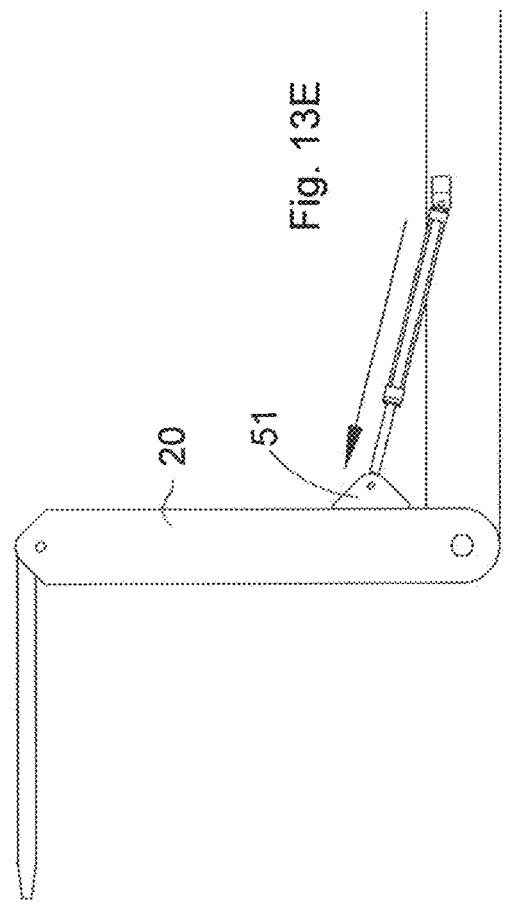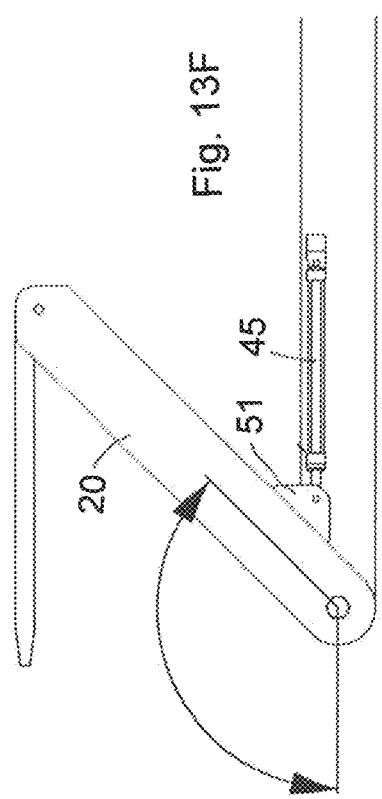

Fig. 14E
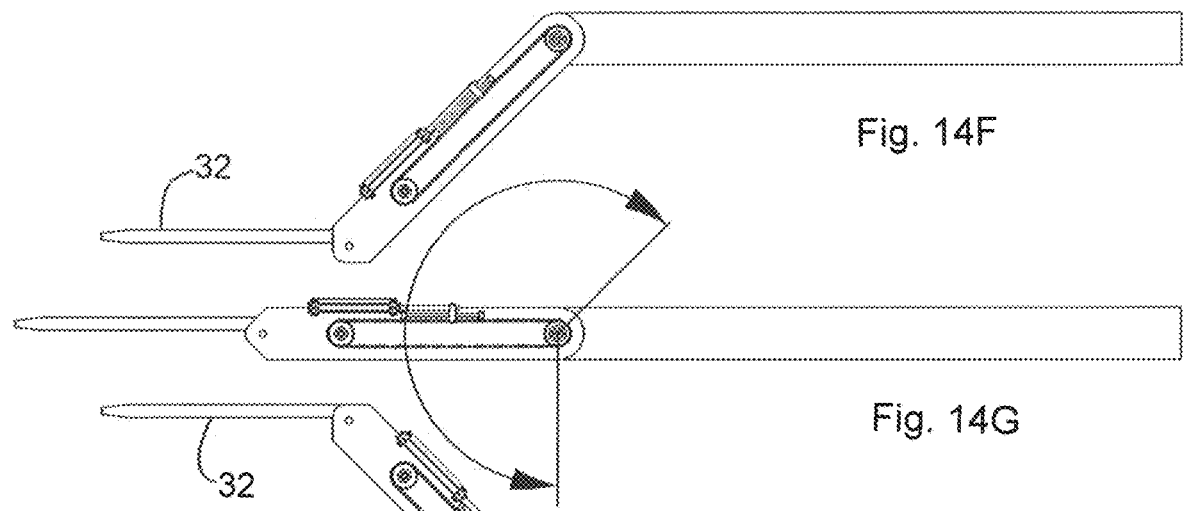
Fig. 14F
Fig. 14G
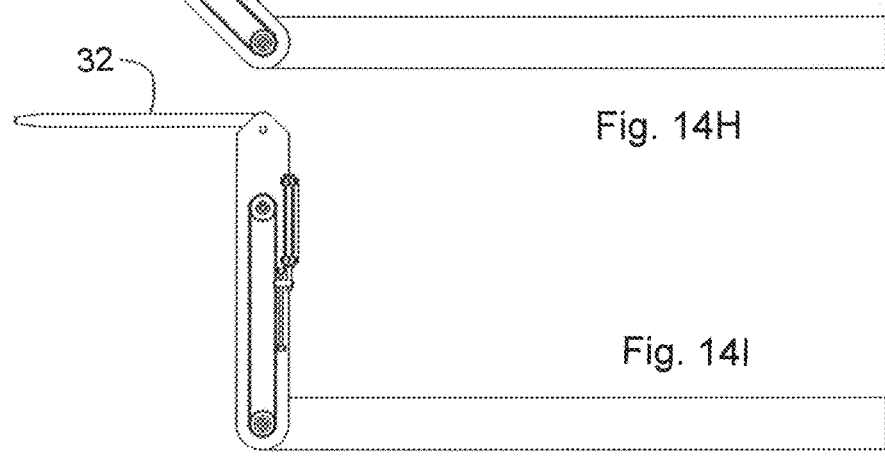
Fig. 14H
Fig. 14I
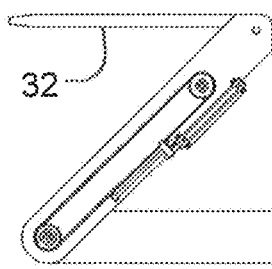
Fig. 14J Fig. 17B
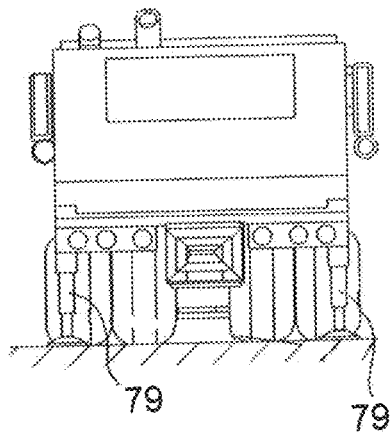
Fig. 17C
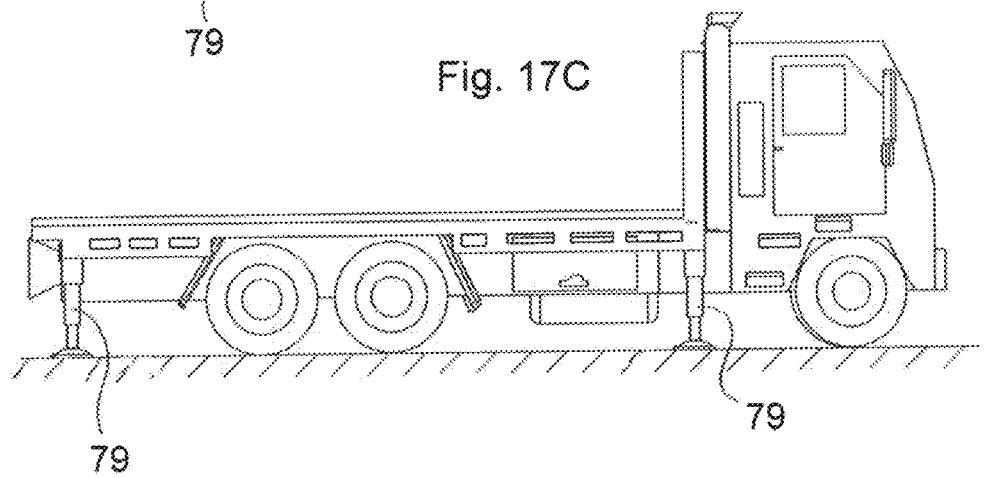
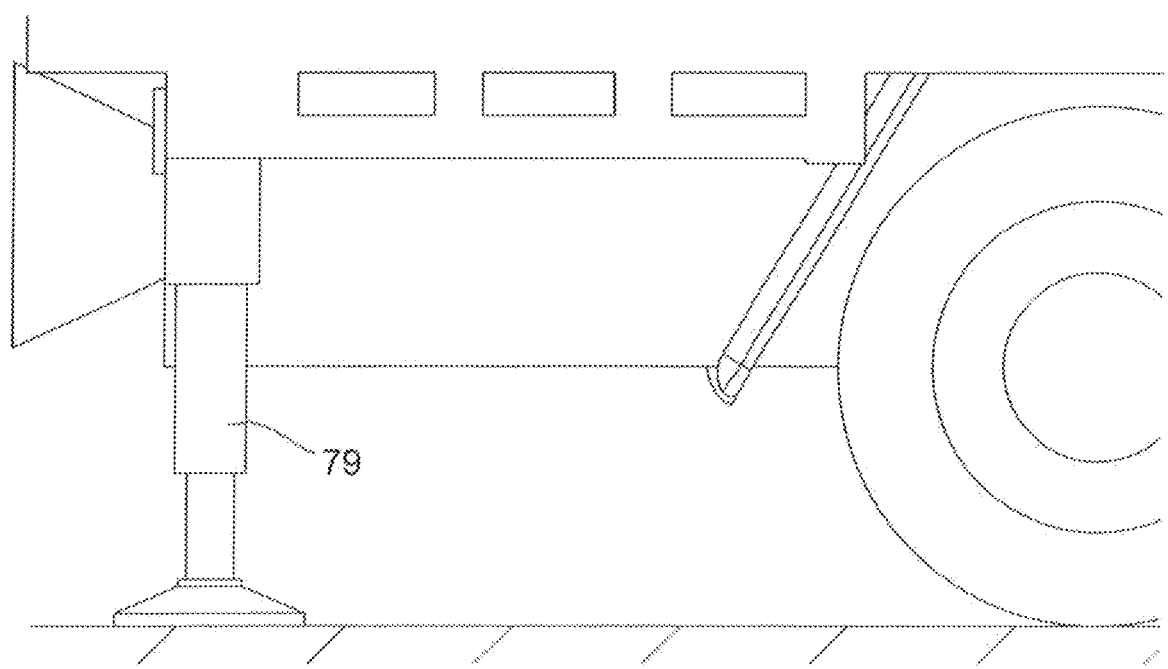
Fig. 17D

LOADING/UNLOADING DEVICE FOR A DELIVERY VEHICLE

FIELD OF THE INVENTION

The present invention relates to an electric/hydraulic loading/unloading device which facilitates unloading of items, objects or other material to be delivered by a delivery vehicle or apparatus and is also useful in facilitating loading of items, objects or some desired material onto the delivery vehicle or apparatus.

BACKGROUND OF THE INVENTION

For larger delivery vehicles, such as a tractor-trailer, for example, a common practice is to support or carry a small fork truck at the rear portion of the trailer. When the tractor-trailer arrives at a delivery location, the small fork truck is then lowered onto the ground and can be operated, by the operator of the tractor-trailer, to unload a desired portion of the shipment and deliver the same to the current delivery location. After this occurs, the fork truck is then reloaded and secured onto the rear portion of the trailer so that the tractor-trailer can then be transported to the next delivery location to make another delivery. This process is repeated numerous times during the course of the day until the entire contents of the tractor-trailer are delivered to the designated delivery locations.

Another common practice is to attach a small crane, or some other loading/unloading device, to the delivery vehicle. The operator can then utilize the crane or other loading/unloading device to facilitate both loading the delivery vehicle and unloading of a desired portion of the shipment at each delivery location.

The drawbacks associated with both of the above techniques of loading and unloading delivery vehicles is that the structural integrity and overall size of the delivery vehicle must be increased in order to facilitate transportation of either the fork truck or the crane or other loading/unloading device. In addition, smaller delivery vehicles, such as flatbeds and the like, which are often utilized to deliver materials such as lumber, appliances, foods/beverages, metal/steel, etc., cannot readily be equipped with a fork truck, a crane or some other suitable loading/unloading device.

SUMMARY OF THE INVENTION

Wherefore, it is an object of the present invention to overcome the above-mentioned shortcomings and drawbacks associated with the prior art delivery vehicles and facilitate either loading and unloading, by an operator, of a delivery shipment of the delivery vehicle at a desired delivery location.

Another object of the present invention is to provide a combined electric/hydraulic loading/unloading device which can readily and easily be installed on new and existing delivery vehicles to assist the operator with easily loading and unloading the desired delivery shipment, from the delivery vehicle, at each desired delivery location.

A further object of the present invention is to provide an electric/hydraulic loading/unloading device which has a range of motion in at least two degrees of freedom of motion, more preferably has a range of motion in at least three degrees of freedom of motion, still more preferably has a range of motion in at least four degrees of freedom of motion, and most preferably has a range of motion in at least five degrees of freedom of motion.

Yet another object of the present invention is to provide an electric/hydraulic loading/unloading device which can be driven by either hydraulic or pneumatic fluid and by at least one electric motor to facilitate easy manipulation of the electric/hydraulic loading/unloading device by the operator.

The present invention relates to a loading/unloading device for attachment to a delivery vehicle to facilitate at least one of loading and unloading of the delivery vehicle, the loading/unloading device comprising: a fixed base member being attachable to the delivery vehicle; a movable base member being supported by and being axially movable, by a first drive, with respect to the fixed base member; a first end of a lifting arm being pivotably connected to a first end of the movable base member, and the lifting arm being pivotably mounted with respect to the movable base member by a second drive to facilitate pivoting movement of the lifting arm relative to the movable base member; and a first end of a support arm being pivotably connected to a second end of the lifting arm, and the support arm being pivotably mounted with respect to the lifting arm to facilitate at least one of loading and unloading of the delivery vehicle.

The present invention also relates to a method of at least one of loading and unloading of a delivery vehicle with a loading/unloading device, the method comprising the steps of: fixedly securing a fixed base member to the delivery vehicle; supporting a movable base member so as to be axially movable relative to the fixed base member by a first drive member; rotatably coupling a first end of a lifting arm, via a second drive, so as to be rotatable with respect to the movable base member; rotatably coupling a first end of a support arm to a second end of the lifting arm; and using the loading/unloading device to facilitate at least one of loading and unloading of the delivery vehicle.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which:

FIGS. 1A-1L, respectively, illustrate different views of a first embodiment of an electric/hydraulic loading/unloading device, according to the invention, for loading and/or unloading of delivery material;

FIGS. 6A-6G, respectively, illustrate different views of a fourth embodiment of the electric/hydraulic loading/unloading device according to the invention;

FIGS. 7A-7E, respectively, illustrate diagrammatic perspective, top plan, front elevational, side elevational and rear elevational views of a fifth embodiment of the electric/hydraulic loading/unloading device according to the invention;

FIGS. 8A-8H is a diagrammatic top plan view diagrammatically showing the range of movement of the support arm platform, shown in FIGS. 7A-7E, relative to a remainder of the electric/hydraulic loading/unloading device;

FIG. 10A is a partial perspective view illustrating another way of rotating the support arm relative to the lifting arm of the electric/hydraulic loading/unloading device, while

FIGS. 15A and 15B, respectively, are top, front, left perspective and bottom, front, left perspective views of an addition mechanism for adjusting movement of the movable base arm with respect to the fixed base arm, while

FIG. 17A is a top plan view of outriggers which extend from the frame of the vehicle for supporting the electric/hydraulic loading/unloading device to provide additional stability to the vehicle when loading and unloading, FIGS. 17B and 17C, respectively, are rear elevational and left side elevational views of stabilizers which extend vertically from the frame of the vehicle for supporting the electric/hydraulic loading/unloading device to provide additional stability to the vehicle, while FIG. 17D is an enlarged diagrammatic view of a rear section of the vertical stabilizers;

FIG. 18A is a diagrammatic left, rear, top plan view while

Figure 1A:
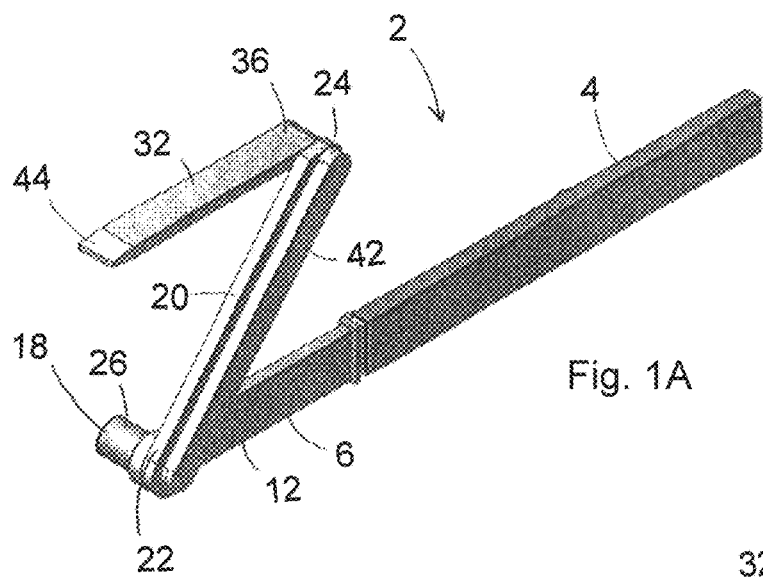
Figure 1B:
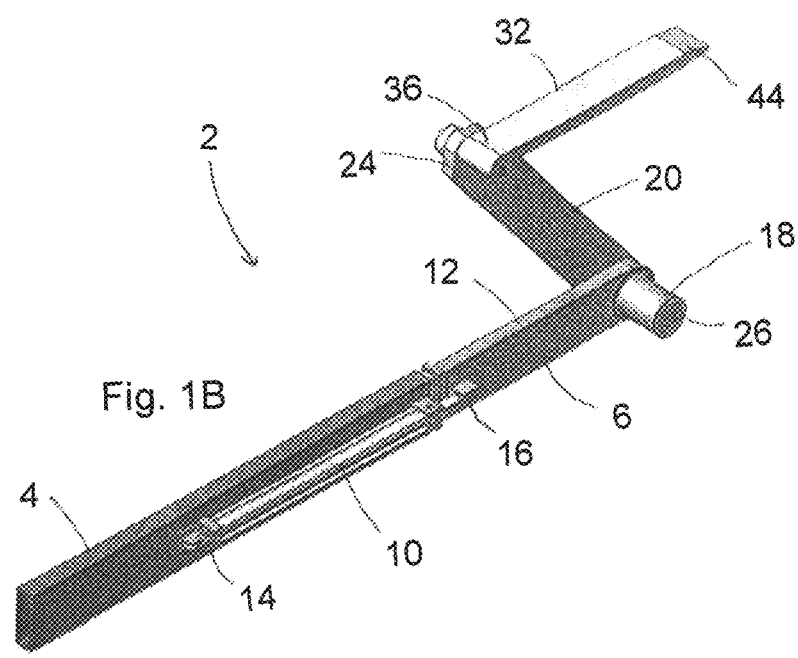

It should be understood that the drawings are not necessarily to scale and that the disclosed embodiments are sometimes illustrated diagrammatically and as partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention.

Turning now to FIGS. 1A-1L, a brief discussion concerning the various components of a first embodiment of the present invention will now be discussed. This brief discussion will then be followed by brief discussions concerning a variety of other embodiments according to the present invention.

As can be seen in this first embodiment, the electric/hydraulic loading/unloading device 2 generally comprises a fixed base member 4 and a movable base member 6 which is axially movable and guided relative to the fixed base member 4. The fixed base member 4 is normally affixed to a frame or some other support structure, such as the bed of a delivery vehicle V (see FIGS. 17A-17C but not shown in these Figures), via a plurality of conventional fasteners (not shown in detail). The fixed base member 4 is typically hollow and defines a central cavity therein which closely and captively receives a second end 8 of the movable base member 6 so as to permit relative sliding movement between the movable base member 6 and the fixed base member 4. One or more bearings (not shown in detail) or other low friction components can be provided, between the fixed base member 4 and the movable base member 6, to facilitate relative sliding movement therebetween. A first drive, e.g., either a pneumatic or a hydraulic piston 10, interconnects the fixed base member 4 with a first end 12 of the movable base member 6 to facilitate controlling the sliding movement between these two components, relative to one another, in the desired direction. A first end 14 of the pneumatic or hydraulic piston 10 is connected to a surface of the fixed base member 4 while a second opposite end 16 of the pneumatic or hydraulic piston 10 is connected adjacent the first end 12 of the movable base member 6.

Figure 1C:
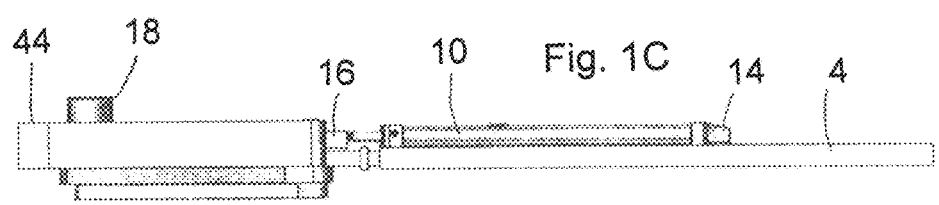
Figure 1D:
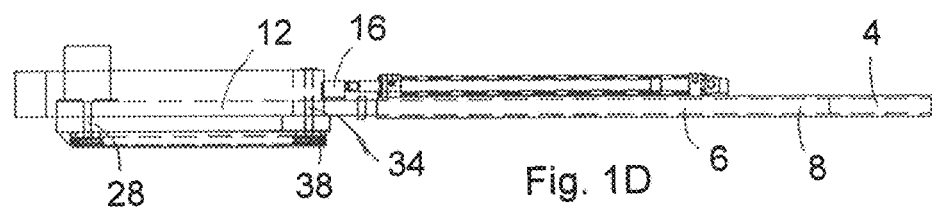
Figure 2A:
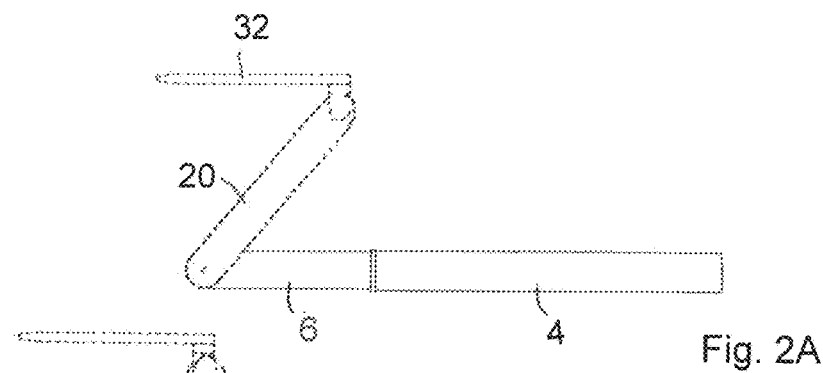
FIGS. 2A-2G, respectively, diagrammatically show the range of movement of the lifting arm and the support arm, shown in FIGS. 1A-1L, to facilitate loading and unloading of a vehicle.
Figure 2B:
Figure 2C:
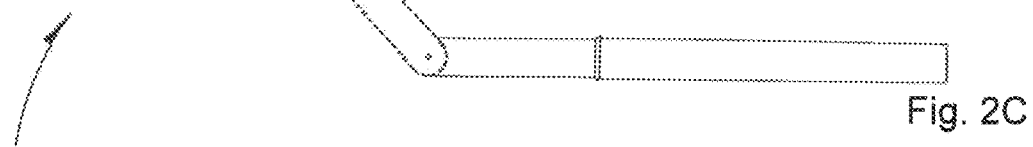
Figure 2D:
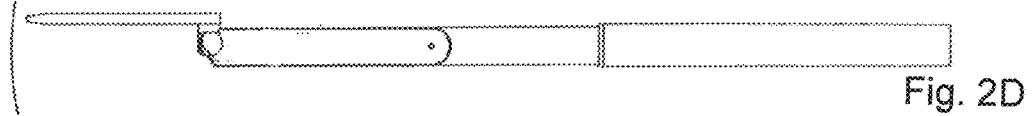
Figure 2E:
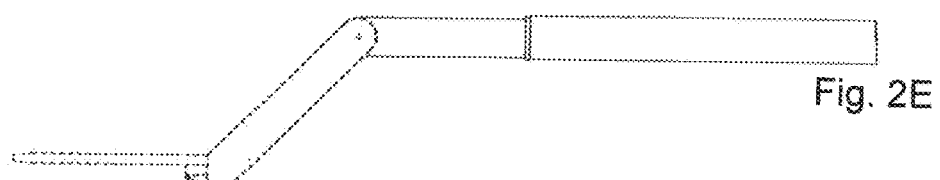
Figure 2F:
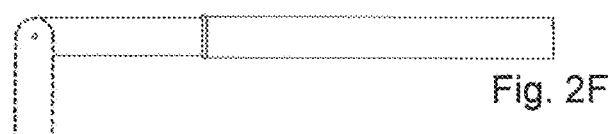
Figure 2G:
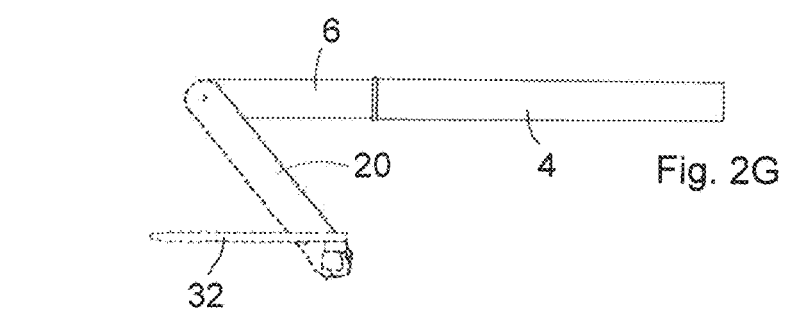
Figure 17A:
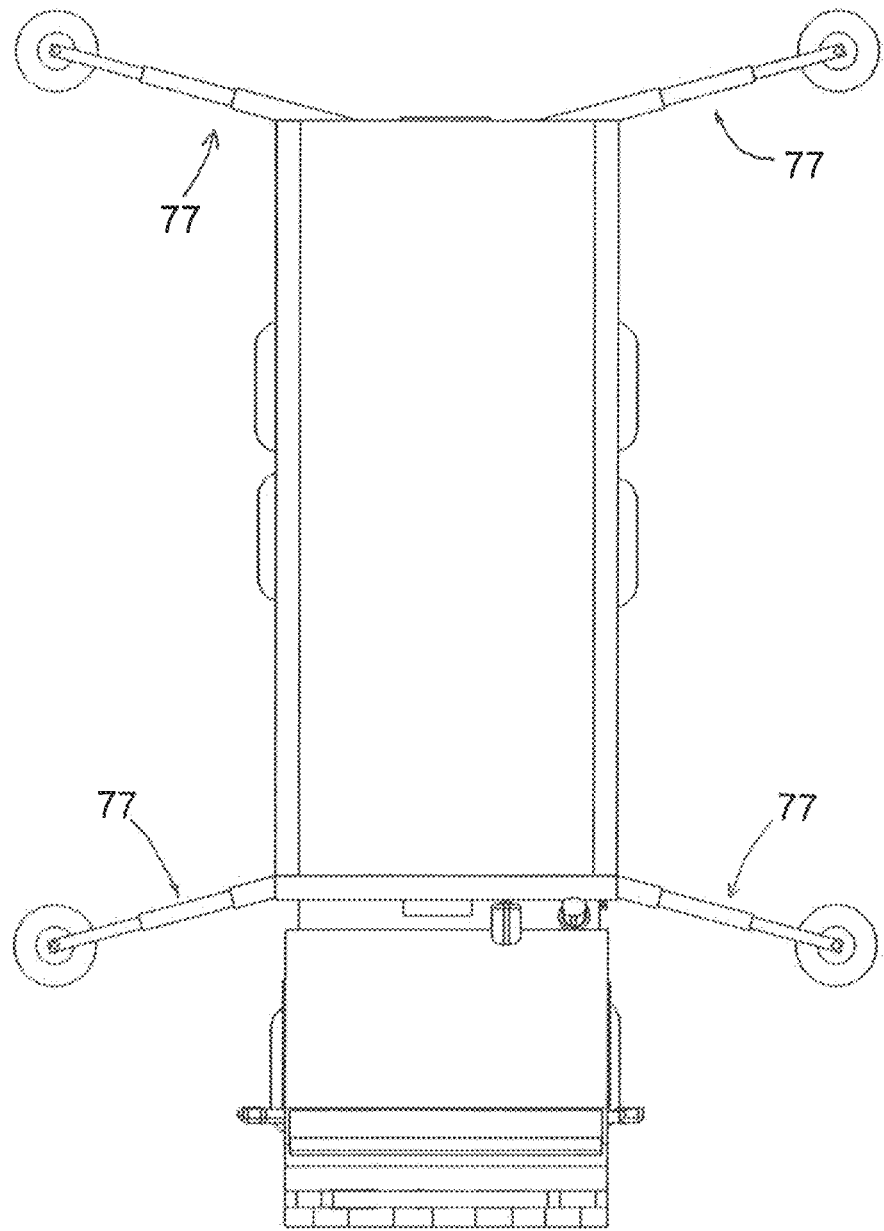

The pneumatic or hydraulic piston 10 facilitates sliding or moving the movable base member 6 from a fully retracted position (as shown in FIGS. 1C and 1D), in which the second end 8 of the movable base member 6 is generally accommodated within the fixed base member 4, to a fully extended position (as shown in FIGS. 1E, 1F and 1L), in which a first end 12 of the movable base member 6 generally projects and extends out from the fixed base member 4. It is to be appreciated, however, that the second end 8 of the movable base member 6 never completely extends out of the fixed base member 4 because the movable base member 6 must always be at least sufficiently supported by the fixed base member 4. This ensures that the load, supported by the movable base member 6, can be transferred to the fixed base member 4 and the frame or other support structure of the vehicle V (as shown in FIGS. 17A-17C).

The remote free first end 12 of the movable base member 6 is rotatably or pivotably connected, by a second electric motor or drive 18, with a first end 22 of a lifting arm 20. An exterior housing 26 of the second electric motor or drive 18 is fixedly connected to the first end 12 of the movable base member 6, by one or more releasable fasteners, for example (not shown), to secure the housing 26 to the movable base member 6. The second electric motor or drive 18 has driven first rotatable shaft 28 that extends completely through a first through bore, formed in the adjacent and overlapped first ends 12, 22 of each of the movable base member 6 and the lifting arm 20. According to a first variant of this embodiment, the remote free second end of the rotatable shaft 28 of the second electric motor or drive 18 has a keyway formed therein. A conventional shaft mount 27 (see FIG. 1H), with a mating keyway, is fixedly supported by the first end 22 of the lifting arm 20 and a key couples the keyway of the shaft mount 27 with the keyway of the rotatable shaft 28 of the second electric motor or drive 18. One or more releasable fasteners, for example (not shown), secure the shaft mount 27 to the lifting arm 20 for rotatably coupling the free end of the rotatable shaft 28 of the second electric motor or drive 18 to the first end 22 of the lifting arm 20 and thereby coupling the lifting arm 20 to the rotatable shaft 28 of the second electric motor or drive 18. Due to such coupling, the second electric motor or drive 18 controls rotation of the lifting arm 20 relative to the movable base member 6. Alternatively, the housing 26 of the second electric motor or drive 18 may be fixedly connected to the lifting arm 20 while the shaft mount 27 of the rotatable shaft 28 of the second electric motor or drive 18 is fixedly connected to the movable base member 6, without departing from the spirit and scope of the present invention. Alternatively, rather than using a shaft mount 27, one of the first through bores, formed in either of the movable base member 6 or the lifting arm 20, may have a slightly larger diameter than the rotatable shaft 28 along with a mating keyway. A key can then be utilized to directly couple the keyway of the rotatable shaft 28 of the second electric motor or drive 18 to the keyway formed in the first through bore of either of the movable base member 6 or the lifting arm 20 to couple those two components to one another.

A conventional bearing arrangement (not shown) is typically accommodated within the through bore formed through the movable base member 6 and the lifting arm 20 so as to facilitate relative rotation between the rotatable shaft 28 of the second electric motor or drive 18, the movable base member 6 and the lifting arm 20. The remote free end of the rotatable shaft 28 of the second electric motor or drive 18 also supports a first gear 30 with a mating keyway. The first gear 30 is secured to the rotatable shaft 28 of the second electric motor or drive 18 by a key so that the first gear 30 rotates with the rotatable shaft 28 of the second electric motor or drive 18.

A second end 24 of the lifting arm 20 has a second through bore that extends therethrough. A driven shaft 34 is fixedly connected to a first end of a support arm 32 and extends through a second through bore formed adjacent the second end 24 of the lifting arm 20. At least one conventional bearing arrangement (not shown) is accommodated within the second through bore of the lifting arm 20 so as to permit relative rotation between the lifting arm 20 and the driven shaft 34/support arm 32. At least a remote free end of the driven shaft 34 has a keyway formed therein and the free end of the driven shaft 34 supports a second gear 38 having a mating keyway. The second gear 38 is secured to the driven shaft 34 by another key so that the second gear 38 rotates with the driven shaft 34.

A chain 40 (schematically shown in FIG. 1I) links the first gear 30 and the second gear 38 to one another so that they rotate in unison with one another during rotation of the rotatable shaft 28. A chain guard 42 covers both of the first and second gears 30, 38 as well as the chain 40. As a result of this gear/chain arrangement, as the lifting arm 20 is rotated relative to the movable base member 6, by rotation of the rotatable shaft 28 of the second electric motor or drive 18, the support arm 32 is correspondingly rotated the same amount. Thus the support arm 32 is always maintained in a substantially parallel orientation with respect to the movable base member 6. This ensures that any item(s), object(s) or other material which is supported by a top surface of the support arm 32, i.e., to be loaded or unloaded, is retained thereon and prevented from inadvertently sliding off the support arm 32.

The pneumatic or hydraulic piston 10 is connected to a conventional pressure (e.g., pneumatic or hydraulic) source of the delivery vehicle V for supplying a sufficient source of pressured fluid thereto. The pneumatic or hydraulic piston 10 is also connected to a control panel CP which facilitates control, by an operator of the delivery vehicle V, of the supply of the pressured fluid to the piston 10. The second electric motor or drive 18 is connected to a conventional power source, e.g., a battery or an alternator, of the vehicle V, for supplying electrical power thereto. The second electric motor or drive 18 is also connected to the control panel CP to facilitate control, by an operator of the delivery vehicle V, of operation (e.g., the rotational speed and the rotational direction) of the second electric motor or drive 18.

Preferably the second electric motor or drive 18 is geared sufficiently low so as to provide precise control of the desired rotational movement of the lifting arm 20 (see FIG. 1I) with respect to the movable base member 6 while still being powerful enough to facilitate lifting a significant amount of weight which may be supported by the support arm 32, that is rotatably connected to the opposed second end 24 of the lifting arm 20, as will be described below in further detail.

According to one embodiment of the invention, a free leading end 44 of the support arm 32 generally feathers or tapers in thickness and/or width into a relatively thin and rounded tip which is designed to facilitate sliding or wedging of the leading end 44 of the support arm 32 between stacked items, objects or other material to be delivered, e.g., loaded or unloaded.

As is apparent from the above discussion, this embodiment of the present invention provides two degrees of freedom for the electric/hydraulic loading/unloading device as indicated by double headed arrows A or B in FIG. 1I. That is, the electric/hydraulic loading/unloading device is able to slid or move to and fro (in the directions of double headed arrow A), relative to and along a longitudinal axis defined by the fixed base member 4, typically along a first (e.g., substantially horizontal) axis, while the lifting arm 20 and the support arm 32 are also able to pivot (in the directions of double arrow B) and move vertically relative to the first end of the movable member 6, as generally shown in FIGS. 2A-2G, to provide the second degree or range of motion in a (e.g., substantially vertical) plane normal to the first (e.g., substantially horizontal) axis.

Figure 3I:
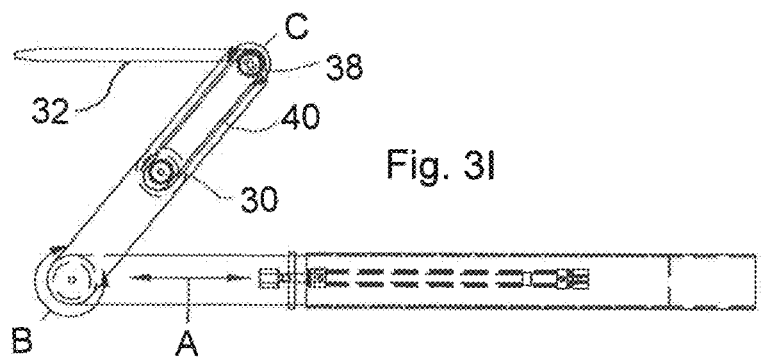
FIGS. 3A-3R, respectively, illustrate different views of a second embodiment of an electric/hydraulic loading/unloading device according to the invention.
Figure 3J:
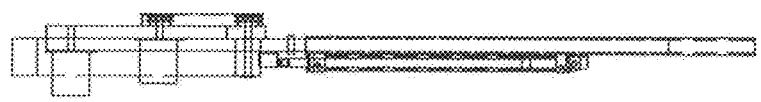
Figure 3K:
Figure 3L:
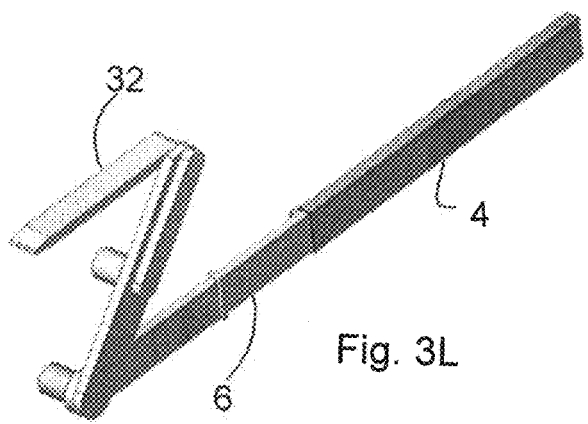
Figure 3M:
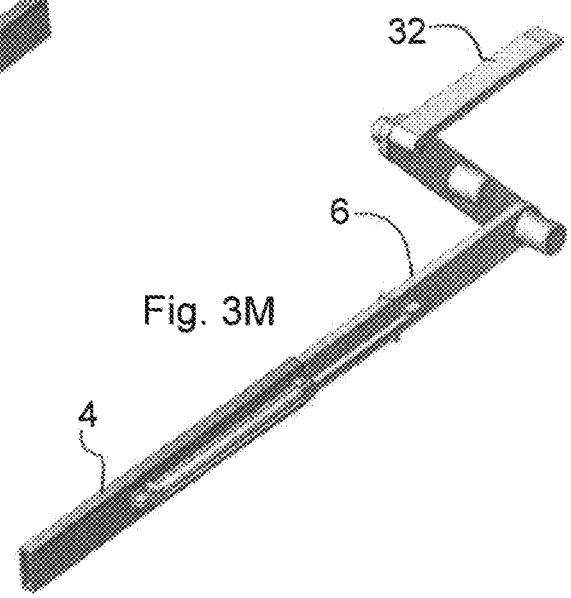
Figure 3N:
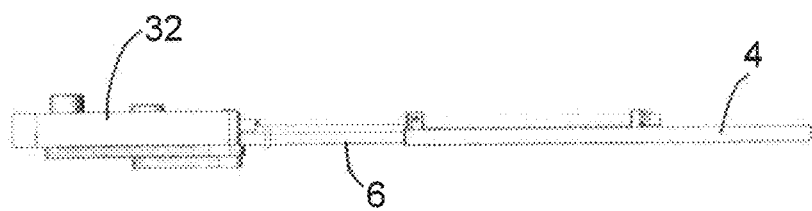
Figure 3O:
Figure 3P:
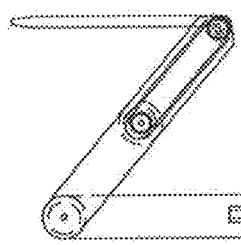
Figure 3Q:
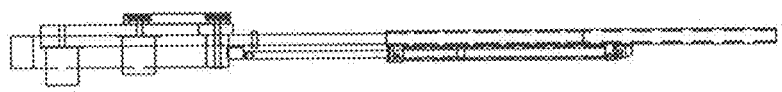
Figure 3R:
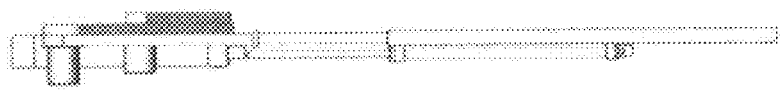

Turning now to FIGS. 3A-3R, a second embodiment of the present invention will now be described. As this embodiment is very similar to the previously discussed embodiment, only the differences between the second embodiment and the first embodiment will be discussed in detail, while identical elements are given identical reference numerals.

In the manner described above, the pneumatic or hydraulic piston 10 facilitates moving the movable base member 6 from a fully retracted position (see FIGS. 3A-3K), in which the movable base member 6 is generally accommodated within the fixed base member 4, into an extended position (see FIGS. 3L-3R), in which the movable base member 6 generally extends out from the fixed base member 4 by a desired (maximum) distance.

The primary difference between the first and the second embodiments is that the second embodiment provides an additional or a third degree of freedom of movement. That is, the support arm 32, in addition to sliding or moving to and fro, as indicated by double headed arrow A relative to and along a longitudinal axis defined by the fixed base member 4 and the lifting arm 20 pivoting relative to the support arm 32 as indicated by double headed arrow B, is able to pivot relative to the lifting arm 20 and thereby provide an additional range, e.g., a third degree of movement, in addition illustrated by double headed arrow C as generally shown in FIG. 3L, for the electric/hydraulic loading/unloading device 2.

As with the first embodiment, the movable base member 6 is supported by the fixed base member 4 and the first end 12 of the movable base member 6 is connected, via the second electric motor or drive 18, to the first end 22 of the lifting arm 20. According to this embodiment, the exterior housing 26 of the second electric motor or drive 18 is fixedly connected to the remote free first end 12 of the movable base member 6, by one or more releasable fasteners (not shown in these figures). The driven rotatable shaft 28 of the second electric motor or drive 18, extends completely through a first through bore, formed in both the first end 12 of the movable base member 6 and the first end 22 of the lifting arm 20. The rotatable shaft 28 of the second electric motor or drive 18 has a keyway formed therein. A shaft mount 27 (see FIG. 1H), with a mating keyway, is supported by the lifting arm 20 and a key (not shown) couples the shaft mount 27 to the first end 22 of the lifting arm 20. One or more releasable fasteners for example (not shown) secure the shaft mount 27 to the first end 22 of the lifting arm 20 for coupling the second electric motor or drive 18 to the lifting arm 20 and controlling rotation thereof. A conventional bearing arrangement (not shown) is accommodated within the first through bore to facilitate rotation of the rotatable shaft 28 of the second electric motor or drive 18 relative to the movable base member 6 and the lifting arm 20. According to this embodiment, the remote free end of the rotatable shaft 28 of the second electric motor or drive 18 does not support any gear, i.e., the rotatable shaft 28 is only connected to the first end 22 of the lifting arm 20.

Figure 4:
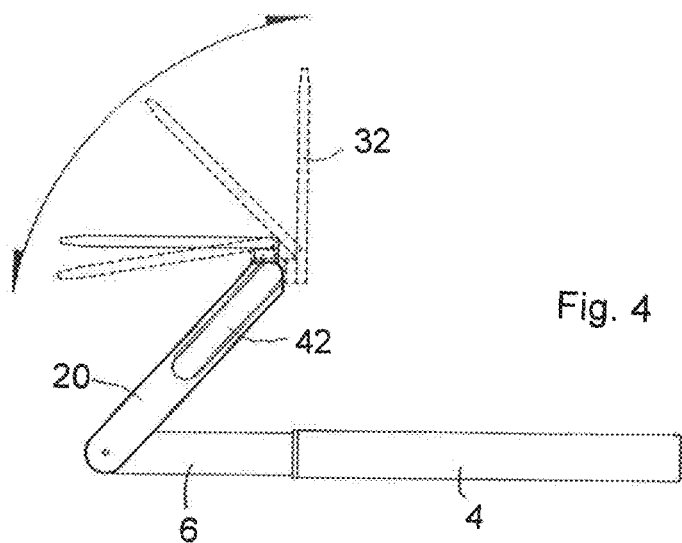
FIG. 4 diagrammatically shows the range of movement of the support arm relative to the lifting arm of the electric/hydraulic loading/unloading device shown in FIGS. 3A-3R.

As with the first embodiment, the driven shaft 34 pivotably connects the second end 24 of the lifting arm 20 with the support arm 32. The driven shaft 34 is support by the lifting arm 20 and extends through the second through bore formed adjacent the second end 24 of the lifting arm 20. A conventional bearing arrangement (not shown in detail) is accommodated within the second through bore of the lifting arm 20 so as to permit relative rotation between the driven shaft 34/support arm 32 and the lifting arm 20 over a range of rotation which is greater than 90 degrees, as generally shown in FIG. 4. The free end of the driven shaft 34 extends through and out of the second through bore and a keyway is formed in the free end of the driven shaft 34. A second gear 38, with a mating keyway, is supported by the free end of the driven shaft 34 and the second gear 38 is secured to the driven shaft 34 by another key so that the driven shaft 34 rotates with the second gear 38.

A third through bore is formed in a section of the lifting arm 20, between the first and the second through bores, and a third rotatable shaft 46 of a third electric motor or drive 48 extends through the third through bore of the lifting arm 20. An exterior housing 50 of the third electric motor or drive 48 is fixedly connected to the lifting arm 20 to secure the third electric motor or drive 48 to the lifting arm 20. A remote free end of the rotatable shaft 46 has a keyway formed therein and the remote free end of the rotatable shaft 46 supports the first gear 30, with a mating keyway. The first gear 30 is secured to the rotatable shaft 46 by another key so that the first gear 30 rotates with the rotatable shaft 46. A conventional bearing arrangement (not shown) is typically accommodated within the third through bore of the lifting arm 20 so as to permit relative rotation between the rotatable shaft 46 of the third electric motor or drive 48 and the lifting arm 20.

A chain 40 links the first gear 30 and the second gear 38 to one another while a chain guard 42 covers both the first and second gears 30, 38 as well as the chain 40. As a result of this gear/chain arrangement, as the lifting arm 20 is rotated relative to the movable base member 6, the support arm 32 is not correspondingly rotated with respect to the lifting arm 20 but remains in the same fixed orientation with respect to the lifting arm 20. However, operation of the third electric motor or drive 48 drives the rotatable shaft 46 of the third electric motor or drive 48 and the first gear 30, which is coupled by the chain 40 to the second gear 38, in order to control the relative position or orientation of the support arm 32 with respect to the lifting arm 20. This arrangement ensures, by manual adjustment of the support arm 32, that any item(s), object(s) or other material which is supported by a top surface of the support arm 32, i.e., to be loaded or unloaded, is retained thereon and prevented from inadvertently sliding off the support arm 32.

Preferably the third electric motor or drive 48 is also geared sufficiently low so as to provide precise control of the desired rotational movement of the support arm 32 with respect to the lifting arm 20 while also facilitating lifting of a significant amount of weight which may be supported by the support arm 32, which is pivotably connected to the second end 24 of the lifting arm 20. The third electric motor or drive 48 is also connected to the conventional power source of the vehicle V, e.g., a battery or an alternator, for supplying electrical power thereto. The third electric motor or drive 48 is also connected to the control panel CP to facilitate control, by the operator of the vehicle V, of operation (e.g., the rotational speed and the rotational direction) of the third electric motor or drive 48.

Turning now to FIGS. 5A-5K, a third embodiment of the present invention will now be described. As this embodiment is very similar to the second embodiment, only the differences between the third embodiment and the second embodiment will be discussed in detail while identical elements are given identical reference numerals.

Figure 5A:
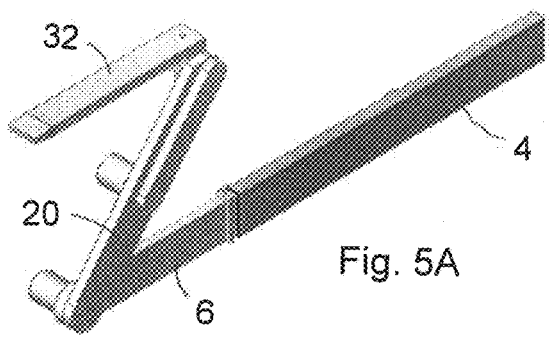
FIGS. 5A-5K, respectively, illustrate different views of a third embodiment of the electric/hydraulic loading/unloading device according to the invention.
Figure 5B:
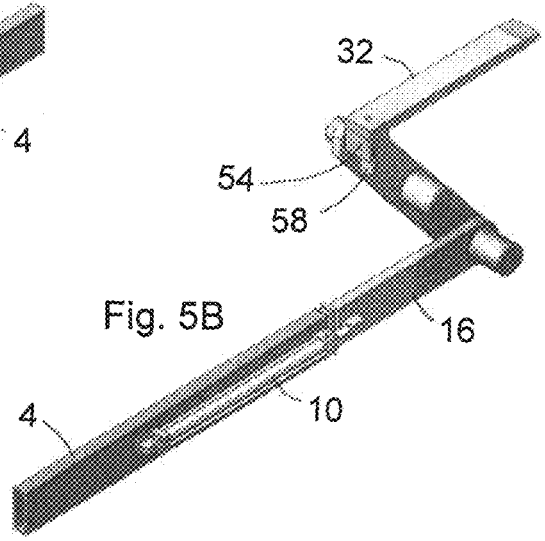
Figure 5C:
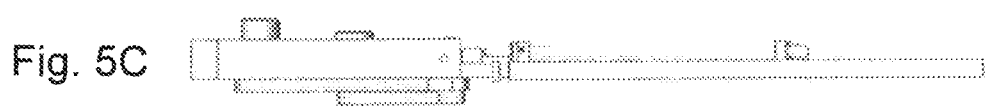
Figure 5D:
Figures 5E, 5F:
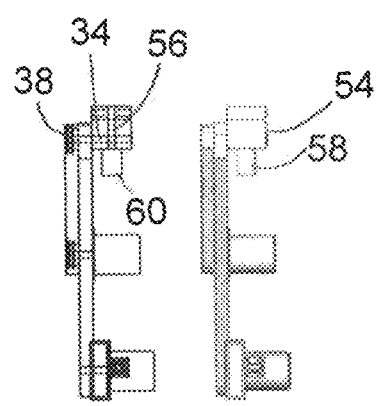
Figures 5G, 5H:
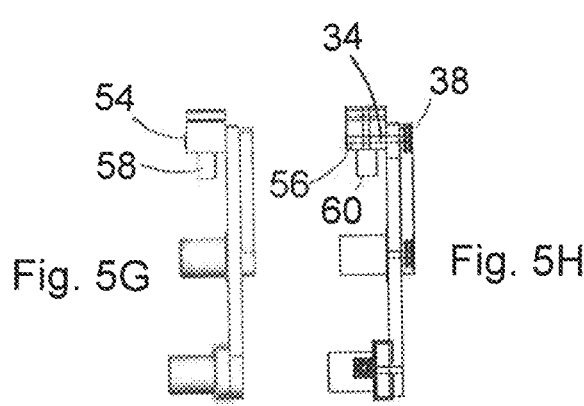
Figure 5I:
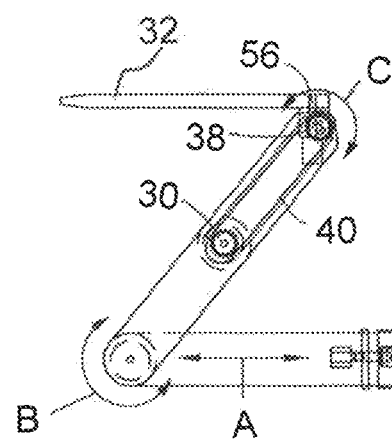
Figure 5J:
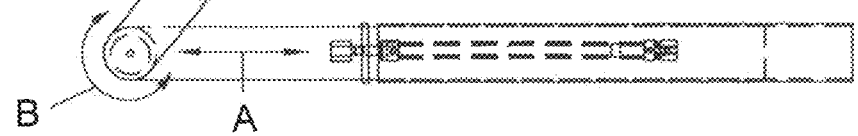
Figure 5K:
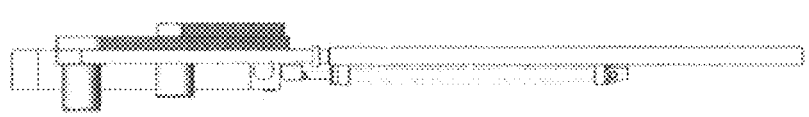

The primary difference between the second and the third embodiments is that the third embodiment provides an additional or fourth degree of freedom of movement as indicated by the double headed arrow D in FIG. 5D. That is, the support arm 32 is also able to rotate in the direction of double arrow D, in addition to pivoting in the direction of double arrow B, relative to the lifting arm 20, and extending in the direction of double arrow A, relative to the fixed base member 4, and thereby provides an additional range of movement for the electric/hydraulic loading/unloading device (see FIGS. 5D and 5I).

According to this embodiment, an intermediate bracket 54 is provided for coupling the lifting arm 20 to the support arm 32. That is, the bracket 54 facilitates rotatably connecting the support arm 32 to the driven shaft 34 and the second end of the lifting arm 20. As shown, the driven shaft 34 is fixedly connected and formed integrally with the bracket 54. The free end of the driven shaft 34 extends through the second through bore of the lifting arm 20 so as to pivotably couple the bracket 54 to the lifting arm 20. A conventional bearing arrangement (not shown) is accommodated within the second through bore of the lifting arm 20, so as to permit relative pivoting between the lifting arm 20 and the driven shaft 34/bracket 54. A remote free end of the driven shaft 34 has a keyway and the remote free end of the driven shaft 34 supports the second gear 38 with a mating keyway. The second gear 38 is secured to the remote free end of the driven shaft 34 by another key so that the driven shaft 34 rotates along with the second gear 38 and thereby, in turn, controls pivoting of the bracket 54/supporting arm 32.

A chain 40 links or couples the first gear 30 to the second gear 38 while a chain guard 42 covers both the first and the second gears 30, 38 as well as the chain 40. As a result of this gear/chain arrangement, as the lifting arm 20 is pivoted relative to the movable base member 6, the support arm 32 is not correspondingly rotated but remains in the same orientation with respect to the lifting arm 20. Operation of the third electric motor or drive 48 drives the rotatable shaft 46 and the first gear 30 which is coupled, by the chain 40, to the second gear 38 in order to control the relative position of the support arm 32 with respect to the lifting arm 20 and thereby manually ensure that any item(s), object(s) or other material, which is supported by a top surface of the support arm 32, is retained thereon and unable to inadvertently slide off the support arm 32.

A fourth through bore is formed in an upwardly facing top surface of the bracket 54 and the fourth through bore extends substantially normal to an axis defined by the driven shaft 34. An exterior housing 60 of the fourth electric motor or drive 58 is fixedly connected to the bracket 54, while a free end of a third rotatable shaft 56 has a keyway formed therein. The rotatable shaft 56, of the fourth electric motor or drive 58, extends through the fourth through bore. The support arm 32 has a mating through bore which supports a mating keyway. The keyway of the support arm 32 is aligned with and connected to the keyway of the rotatable shaft 56 by another key. Due to this arrangement, as the rotatable shaft 56 of the fourth electric motor or drive 58 rotates, the support arm 32 is correspondingly rotated. A conventional bearing arrangement (not shown) is accommodated between the support arm 32 and an adjacent surface of the bracket 54 so as to facilitate or assist with rotation of the support arm 32 relative to the bracket 54.

Preferably the fourth electric motor or drive 58 is also geared sufficiently low so as to provide precise control of the desired rotational movement of the support arm 32 with respect to the bracket 54 even in the event that the support arm 32 is supporting a significant amount of weight. The fourth electric motor or drive 58 is also connected to the conventional power source of the vehicle V, e.g., a battery or an alternator for supplying electrical power thereto. The fourth electric motor or drive 58 is also connected to the control panel CP to facilitate control, by the operator of the vehicle V, for operation (e.g., the rotational speed and the rotational direction) of the fourth electric motor or drive 58. An additional bearing arrangement or assembly (not shown) may be accommodated within the fourth through bore so as to facilitate rotation of the support arm 32 relative to the bracket 54.

Turning now to FIGS. 6A-6G, a fourth embodiment of the present invention will now be described. As this embodiment is very similar to the third embodiment, only the differences between the third and the fourth embodiments will be discussed in detail while identical elements are given identical reference numerals.

The primary difference, between the fourth embodiment and the third embodiment, is that the fourth embodiment comprises a generally C-shaped support arm platform 62, i.e., a pair of parallel support arms connected with one another by a base coupling arm, instead of a single support arm as with the third embodiment. This embodiment still has a fourth degree of freedom of movement, as generally indicated by the double headed arrow D in FIG. 6C. That is, the support platform 62 is both able to pivot in the direction of double arrow B relative to the lifting arm 20, extend in the direction of double arrow A relative to the fixed arm 4, as well as rotate in the direction of double arrow D relative to the bracket 54 and the lifting arm 20, so as to provide an additional range of movement for the electric/hydraulic loading/unloading device 2 (see FIGS. 6C and 6F).

Similar with the third embodiment, the bracket 54 facilitates rotatably connecting the second end 24 of the lifting arm 20 with the support platform 62 by the driven shaft 34. In addition, the fourth through bore is formed in the bracket 54 and the fourth through bore extends substantially normal to an axis defined by the driven shaft 34 and parallel to a plane defined by the lifting arm 20. The rotatable shaft 56 of the fourth electric motor or drive 58 extends through the fourth through bore. An exterior housing 60 of the fourth electric motor or drive 58 is fixedly connected to the bracket 54 while the free end of the rotatable shaft 56 has a keyway formed therein. The support arm platform 62 has a mating through bore which has a mating keyway. The keyway of the support arm platform 62 is aligned and connected to the keyway of the rotatable shaft 56 by another key so that the support arm platform 62 rotates along with the rotatable shaft 56 of the fourth electric motor or drive 58. A conventional bearing arrangement (not shown) is located between a top surface of the bracket 54 and an adjacent bottom surface of the support arm platform 62 to facilitate relative rotation therebetween. An additional bearing arrangement (not shown in detail) may be provided within the fourth through bore so as to facilitate relative rotation between the rotatable shaft 56 of the fourth electric motor or drive 58 and the bracket 54.

Turning now to FIGS. 7A-7E, a fifth embodiment of the present invention will now be described. As this embodiment is very similar to the fourth embodiment, only the differences between the fourth and the fifth embodiments will be discussed in detail, while identical elements are given identical reference numerals.

The primary difference, between the fifth embodiment and the fourth embodiment, is that the fifth embodiment includes an additional, fifth degree of freedom of movement, as generally indicated by the double headed arrow E shown in FIG. 7B. That is, the electric/hydraulic loading/unloading device 2, including the movable and the fixed base members 6, 4, the lifting arm 20 and the support arm platform 62, are supported by a rotatable disc 64 so as to rotate together in unison with one another relative to the frame or the support structure of the delivery vehicle V and thereby provide an additional range of movement for the electric/hydraulic loading/unloading device 2.

As shown in FIGS. 7C-7E, the fixed base member 4 is fixedly supported to a bottom or under surface of the rotatable disc 64. It is to appreciated that the fixed base member 4 may be fixedly supported to a top or upper surface of the rotatable disc 64, without departing from the spirit and scope of the present invention. The rotatable disc 64 includes a central shaft 66 and the frame or the support structure of the vehicle V has a mating shaft bore (not shown) which receives the central shaft 66. A bearing is located between the shaft bore of the delivery vehicle V and the central shaft 66 to facilitate rotation of the rotatable disc 64 relative to the frame or support structure of the vehicle V. In addition, one or more other conventional peripheral supports and/or bearings many be utilized to assist with rotatably securing the rotatable disc 64 to the frame or the support structure of the vehicle V and facilitating rotation of the rotatable disc 64 relative to the frame or the support structure of the vehicle V.

The outwardly facing peripheral surface of the rotatable disc 64 has a plurality of outwardly facing teeth 68 formed therein. A fifth electrical motor or drive 70 is fixedly supported by the frame or support structure. A free end of a fourth rotatable shaft 72 of the fifth motor or drive 70 supports a gear 74 which has teeth 76 that matingly engage with the teeth 68 formed in the outwardly facing peripheral surface of the rotatable disc 64. As a result of such arrangement, rotation of the fifth electrical motor or drive 70, in a first rotational direction, causes the rotatable disc 64, along with the supported electric/hydraulic loading/unloading device 2, to rotate in a first rotational direction about the central shaft 66, while rotation of the fifth electrical motor or drive 70, in a second opposite rotational direction, causes the rotatable disc 64, and the supported electric/hydraulic loading/unloading device 2, to rotate in a second opposite rotational direction about the central shaft 66.

FIGS. 8A through 8H diagrammatically show the support arm platform 62 in a variety of different rotational orientations with respect to a remainder of the electric/hydraulic loading/unloading device 2. Such positions facilitate both loading and unloading, by the supported electric/hydraulic loading/unloading device 2, of a desired item(s), object(s) or other material to be delivered to, or retrieved from, a desired site. Although the support arm platform 62 and the electric/hydraulic loading/unloading device 2 are associated with the rotatable disc 64, as shown in FIG. 8A, it is to be appreciated that the fixed base member 4 of the electric/hydraulic loading/unloading device 2 may, alternately, be directly affixed to the frame or the support structure of the vehicle V.

Figure 9A:
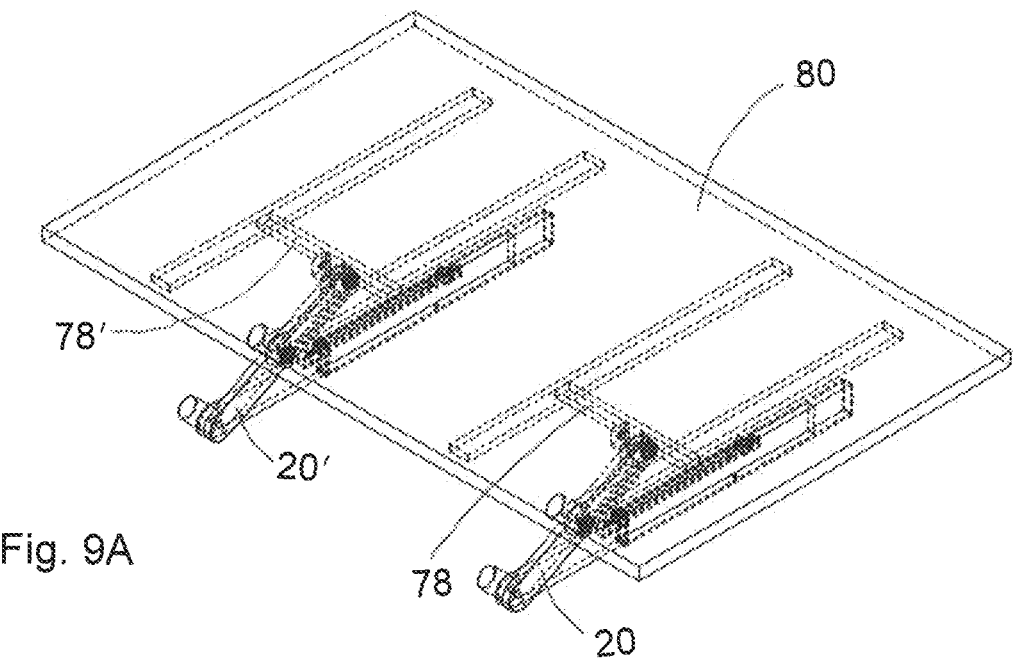
FIGS. 9A and 9B, respectively, are a diagrammatic bottom perspective view and a diagrammatic top perspective view showing a further application of the electric/hydraulic loading/unloading device according to the invention.
Figure 9B:
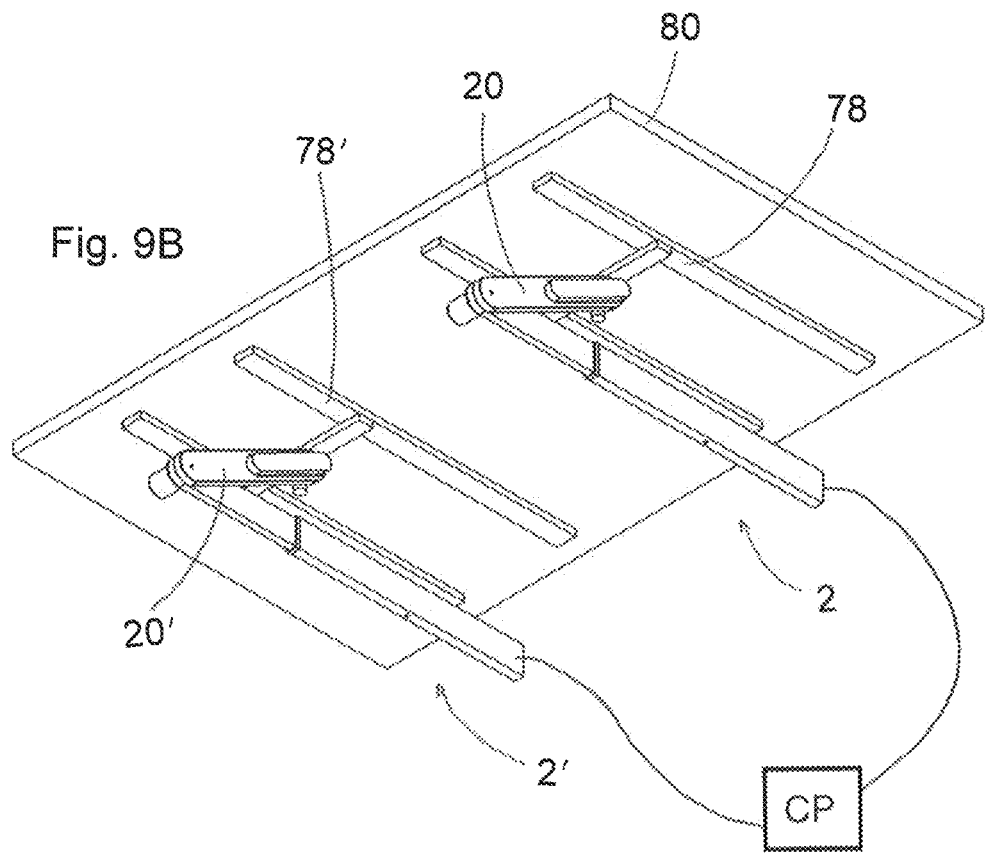

FIGS. 9A and 9B show one application of the electric/hydraulic loading/unloading device 2 according to the present invention. According this application, the fixed base members 4 of a pair of substantially identical electric/hydraulic loading/unloading devices 2, 2', according to the second embodiment, are supported by the support structure, e.g., the frame of a delivery vehicle V, in this instance. According to this application, each support arm is replaced with a support frame 78, 78'. A central coupling arm of the support frame 78 or 78' is connected to the respective lifting arms 20 or 20' in the manner described above with respect to the fourth embodiment. Each one of the support frames 78 or 78' is securely fastened, e.g., by welding, bolts, etc., to the bottom of a support surface 80. The pair of electric/hydraulic loading/unloading devices 2, 2', according to this embodiment, are both coupled to the control panel CP and operate in unison with one another. The arrangement is useful in facilitating loading and unloading of the entire contents of the support surface 80 of the vehicle V.

Figure 10A:
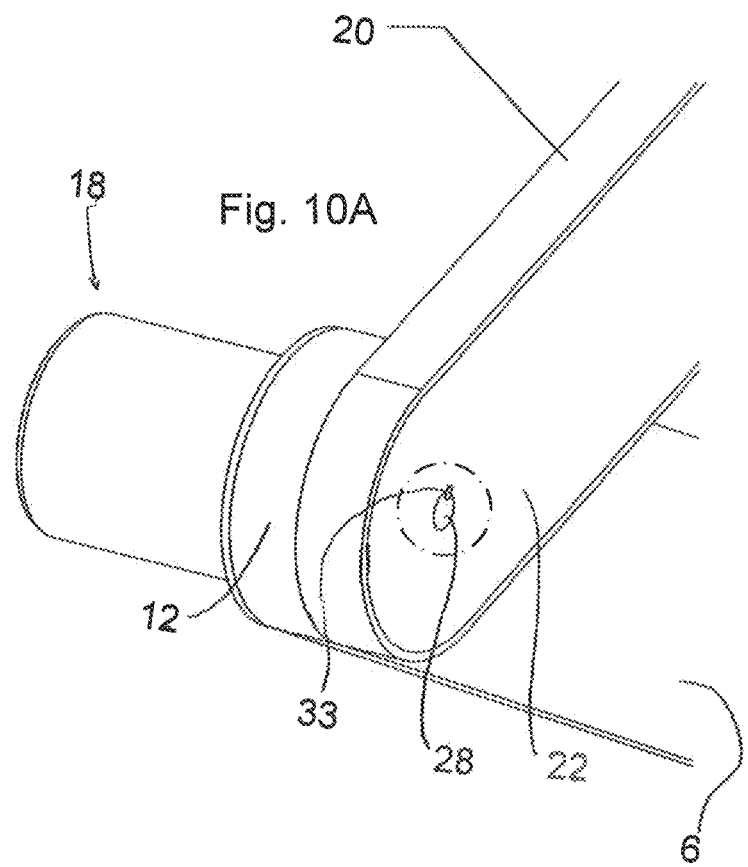
Figure 10B:
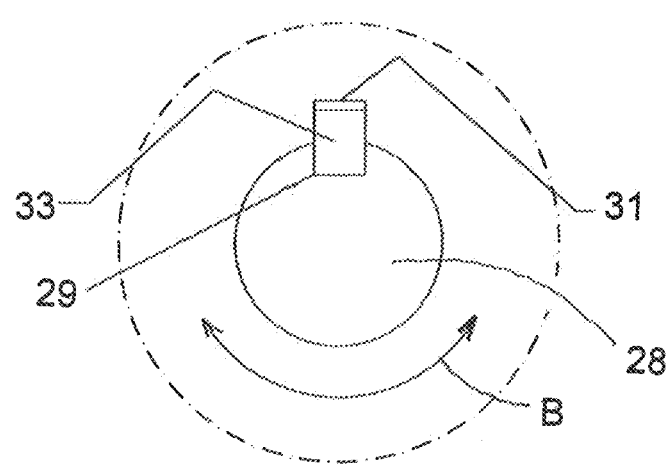
FIG. 10B is a diagrammatic side view of the shaft of FIG. 10A.
Figure 11A:
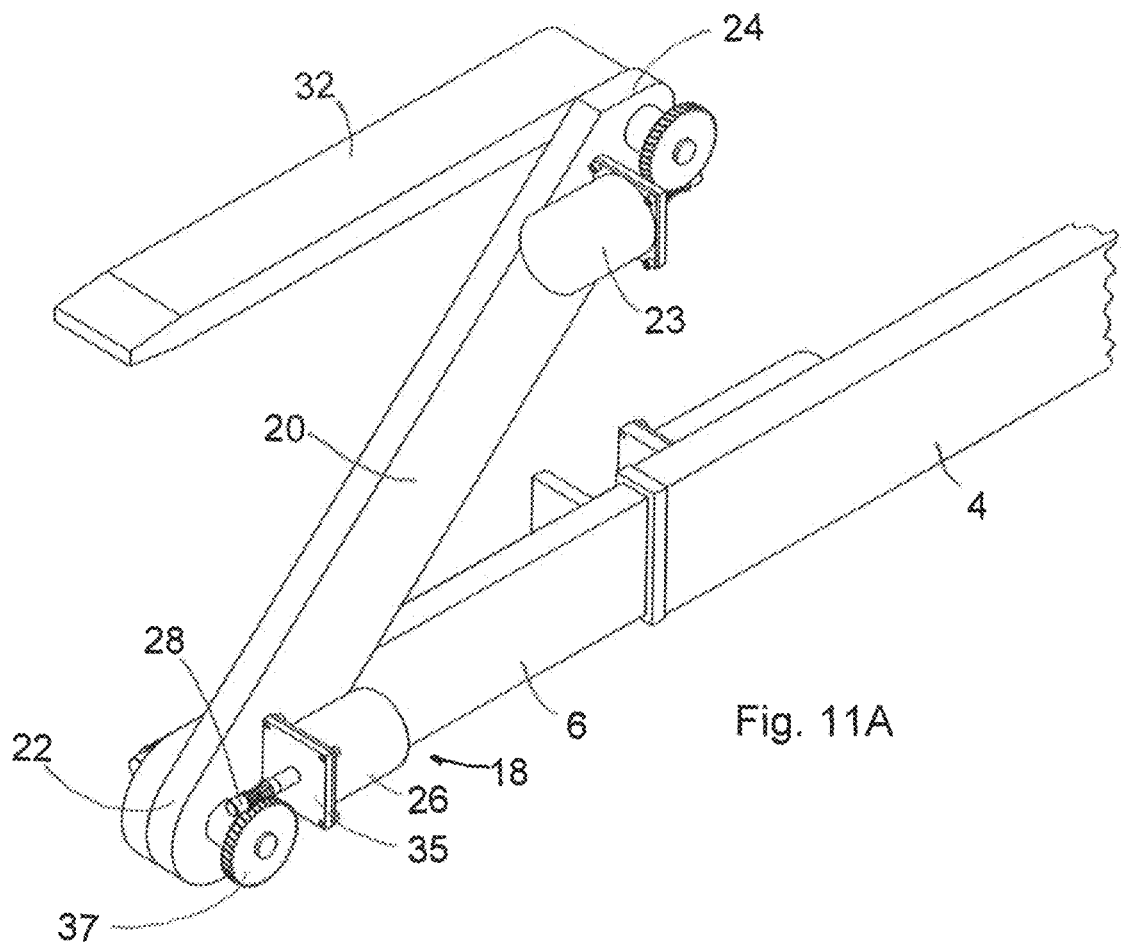
FIGS. 11A-11D, respectively, are top, front, right perspective, bottom, front, right perspective, side elevational, and top plan views of a further way of rotating the support arm relative to the lifting arm of the electric/hydraulic loading/unloading device according to the present invention.
Figure 11B:
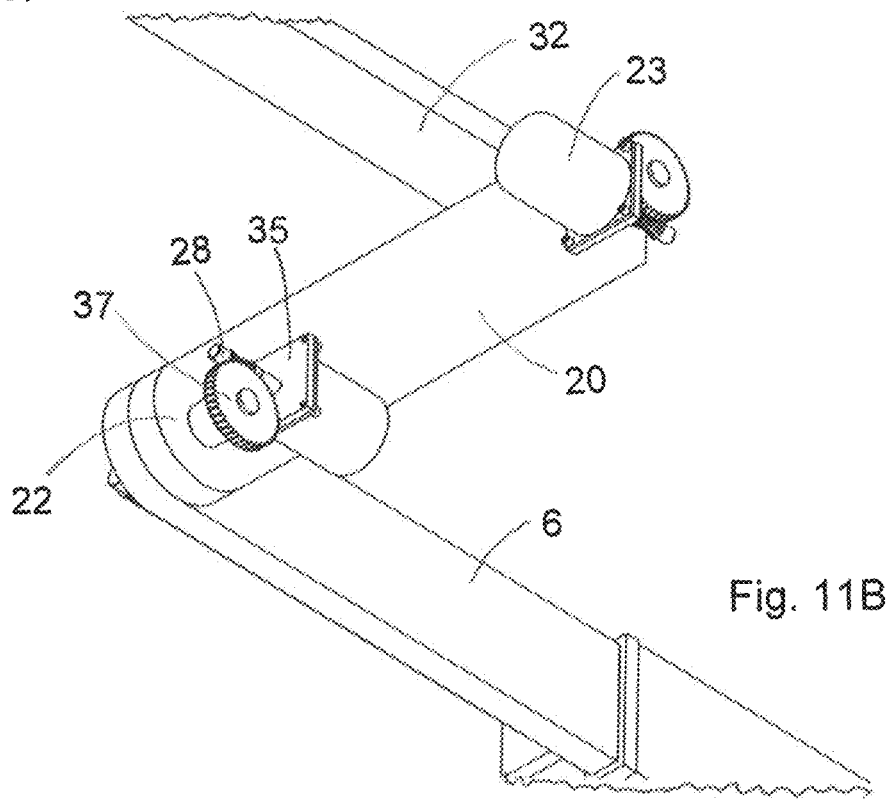
Figure 11D:
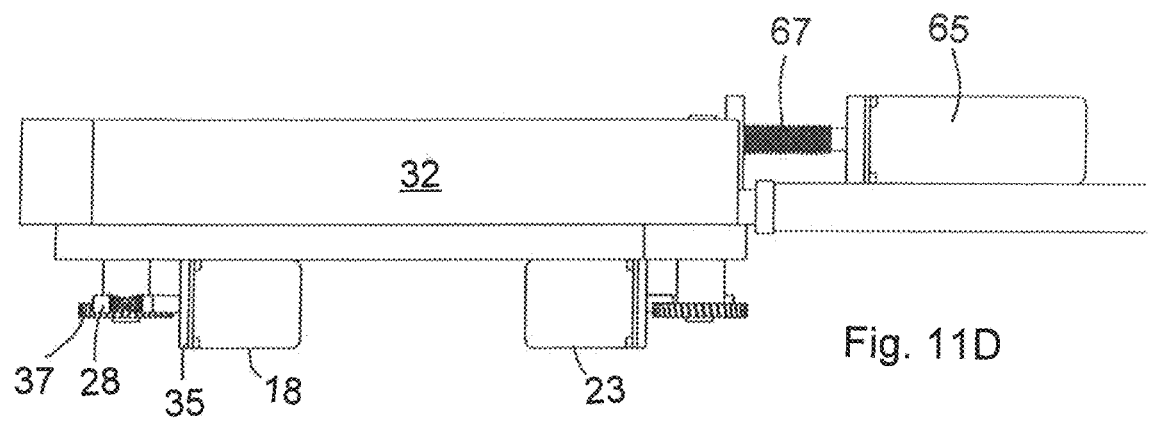
Figure 11C:
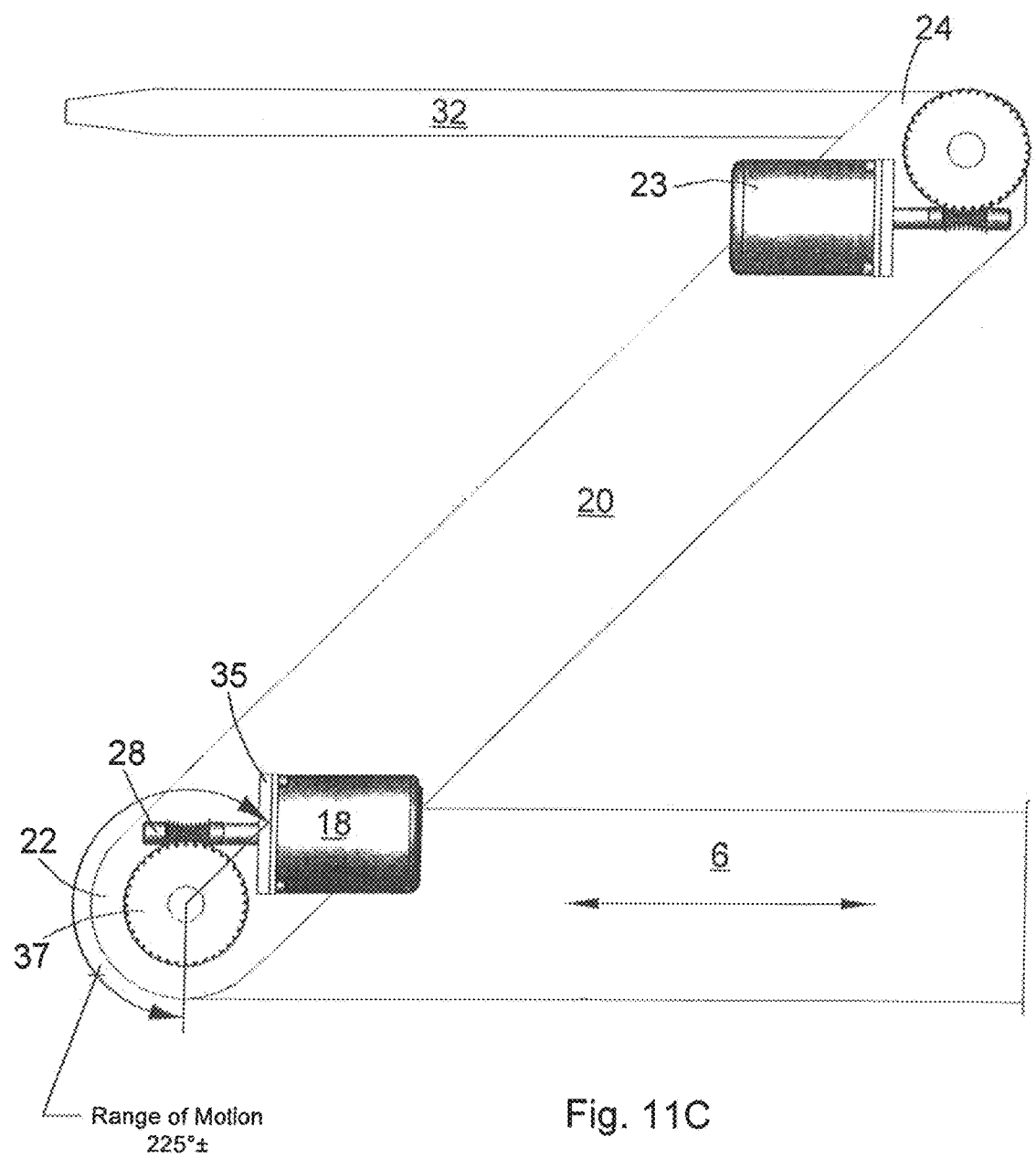

FIGS. 10A and 10B show an alternate arrangement for rotating the lifting arm 20 with respect to the movable base member 6. In a manner similar to that described above, the driven first rotatable shaft 28 of the second electric motor or drive 18, extends completely through a first through bore, formed in the first end 12 of the movable base member 6 and the first end 22 of the lifting arm 20, and the rotatable shaft 28 of the second electric motor or drive 18 has a keyway 29 formed therein. A mating keyway 31, formed the first end 22 of the lifting arm 20, and an associated key 33 couples the keyway 29 of the rotatable shaft 28 of the second electric motor or drive 18 to the mating keyway 31 of the lifting arm 20. A conventional bearing arrangement (not shown) is accommodated within the first through bore in the first end 12 of the movable base member 6 to facilitate rotation between the movable base member 6 and the lifting arm 20.

It is to be appreciated that there exists a number of variants for rotatably driving the lifting arm 20 with respect to the movable base member 6 and/or the support arm 32 with respect to the lifting arm 20, and all such conventional variations are considered to fall within the spirit and scope of the present invention. FIGS. 11A-11D, for example, illustrate one variation in which the rotatable movement between the respective arms, e.g., movement of the lifting arm 20 with respect to the movable base member 6 and/or the support arm 32 with respect to the lifting arm 20, is accomplished by a conventional worm drive or worm gear. As shown, the housing 26 of the second electric motor or drive 18 is fixedly connected to a motor or drive mount 35 which, in turn, is fixedly secured to the first end 22 of the lifting arm 20. The driven rotatable shaft 28 extends completely through a through bore provided in the motor or drive mount 35 and the free end of the rotatable shaft 28 transitions into a worm, e.g., a helical groove which forms a first portion of the worm drive. A shaft is fixedly supported by the first end 12 of the movable base member 6 and the fixed shaft extends through the through bore provide in the first end 22 of the lifting arm 20. The fixed shaft supports a mating worm gear 37.

As the rotatable shaft 28 rotates, the worm formed at the free end thereof drives the mating worm gear 37 which is fixed secured to the movable base member 6 and this induces relative pivoting movement of the lifting arm 20. The lifting arm 20 is rotatably supported by the movable base member 6. As described above, a conventional bearing arrangement (not shown) is accommodated within a through bore in the lifting arm 20 so as to facilitate relative rotational movement between the lifting arm 20 and the shaft of the worm gear 37. Due to this arrangement in this embodiment, rotation of the rotatable shaft 28 of the second electric motor or drive 18 rotationally drives the worm gear 37 and causes the lifting arm 20 to rotate with respect to the movable base member 6 over a desired rotational range of motion of approximately 225 degrees.

FIGS. 11A-11D also illustrate a third electric motor or drive 23 fixed adjacent the second end 24 of the lifting arm 20. A corresponding worm drive, associated with the third electric motor or drive 23, facilitates pivoting of the support arm 32 with respect to the lifting arm 20 in the same manner described above. It is to be noted that each of these two electric motors or drives 18, 23 may be driven independent of one another such that the relatively orientation between the lifting arm 20 and the movable base member 6 and between the support arm 32 and the lifting arm 20 can be adjusted, as desired. According to this embodiment, each of these two electric motors or drives 18, 23 is coupled to the control panel CP (not shown) which facilitates controlling operation thereof in the manner previously described.

Figure 12A:
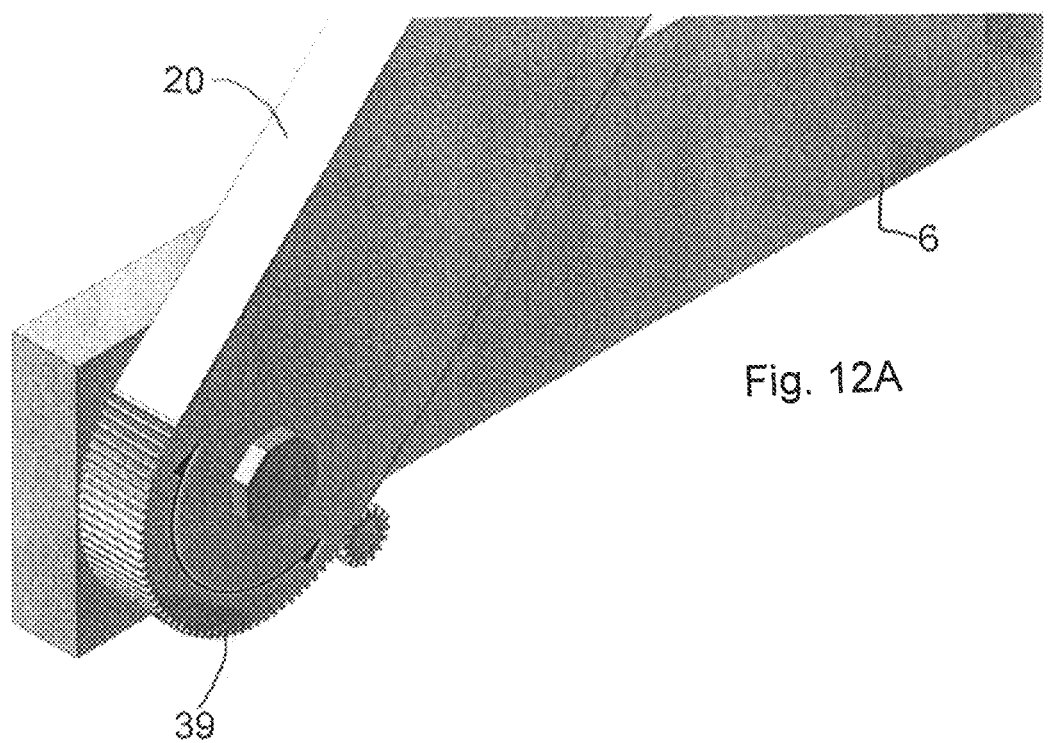
FIGS. 12A and 12B, respectively, are top, front, right perspective and bottom, front, right perspective views of yet another way of facilitating rotation of the support arm relative to the lifting arm of the electric/hydraulic loading/unloading device.
Figure 12B:
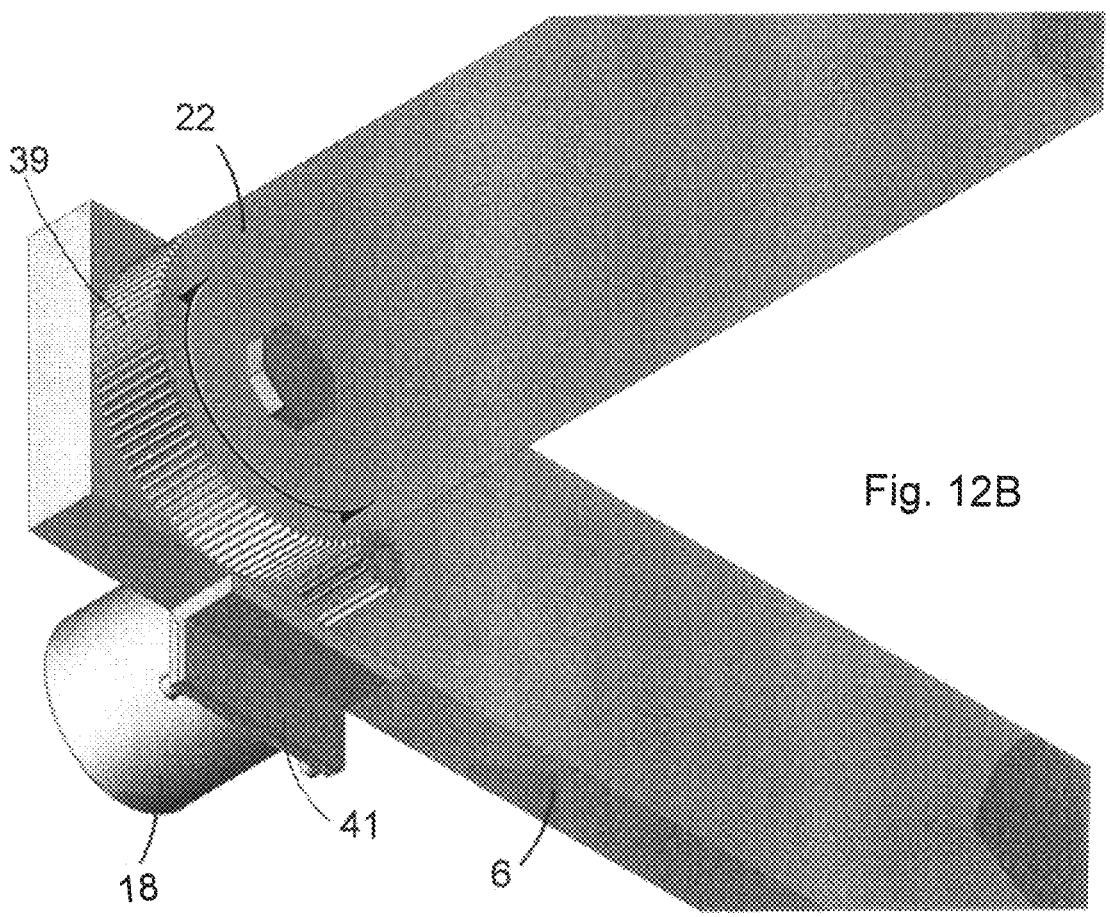
Figure 13A:
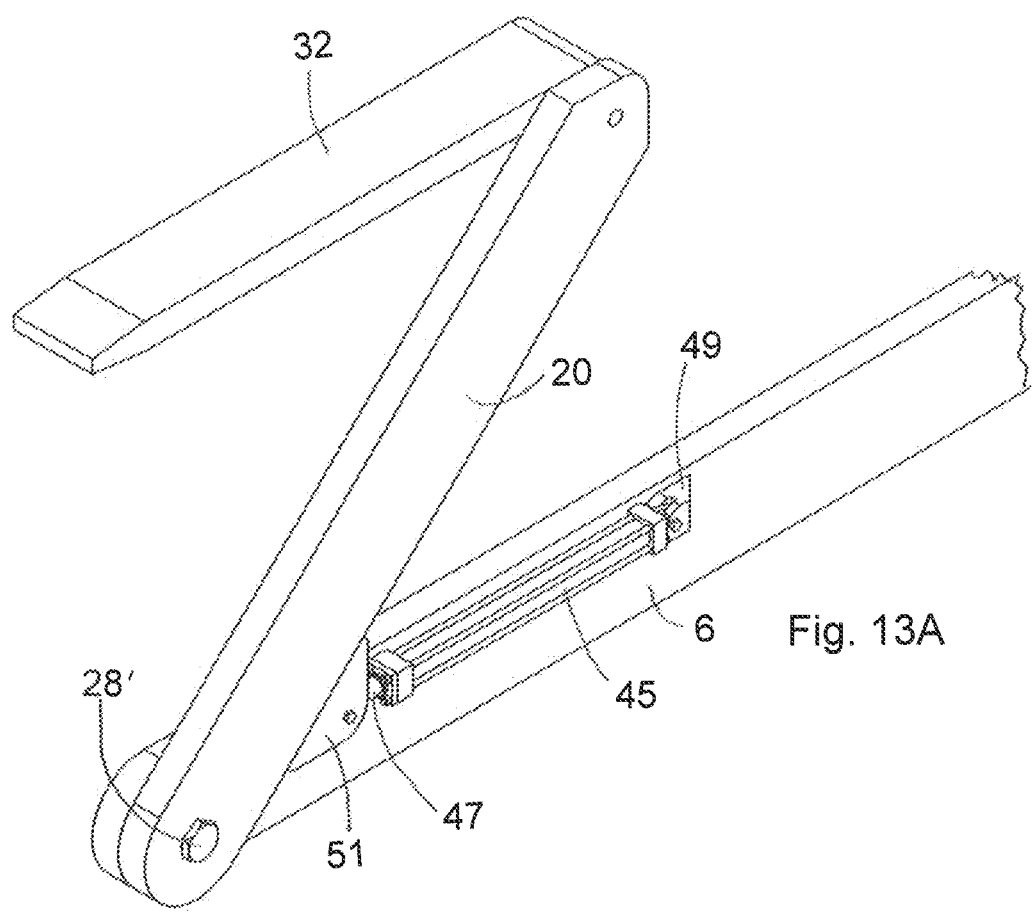
FIGS. 13A and 13B, respectively, are top, front, right perspective and bottom, front, right perspective views of an addition mechanism for rotating the support arm relative to the lifting arm of the electric/hydraulic loading/unloading device, while FIGS. 13C-13F, respectively, are side elevational views showing the range of movement of the electric/hydraulic loading/unloading device of FIGS. 13A and 13B.
Figure 13B:
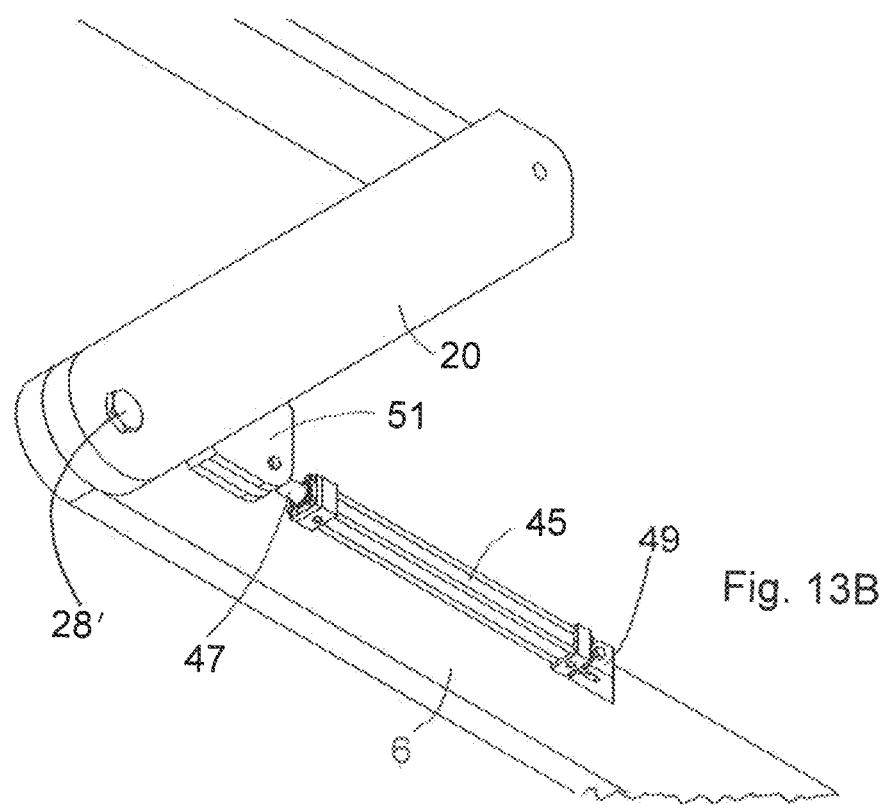

FIGS. 12A and 12B illustrate another variation which facilitates rotatable movement between the movable base member 6 and the lifting arm 20. According to this variation, an external gearing 39 is formed in an outer periphery of the first end 22 of the lifting arm 20. A motor or drive mount 41 is secured to the first end 12 of the movable base member 6 and the second electric motor or drive 18 is fixedly connected to the motor or drive mount 41. In this case, a spur gear 43 is fixedly secured, e.g., by a key for example, to the remote free end the rotatable shaft 28 of the second electric motor or drive 18. Alternatively, the spur gear 43 may be integrally formed at the free end of the rotatable shaft 28. The rotational axis of the rotatable shaft 28 of the second electric motor or drive 18 is offset from a rotating or pivoting axis of the lifting arm 20 with respect to the movable base member 6. The lifting arm 20 can be pivotably supported by the movable base member 6 in a variety of different manners as long as the spur gear 43 engages with the external gearing 39 of the lifting arm 20 so that rotational drive from the second electric motor or drive 18 causes rotational movement of the lifting arm 20 with respect to the movable base member 6.

FIGS. 13A-13F illustrate a further variation by which the lifting arm 20 can be pivoted with respect to the movable base member 6. According to this variation, the first end 22 of the lifting arm 20 is rotatably or pivotally secured to the first end 12 of the movable base member 6 by a shaft 28' which forms a rotational axis. An actuation piston/cylinder arrangement, e.g., an actuation cylinder, couples the first end 12 of the movable base member 6 to the first end 22 of the lifting arm 20 such that pressurization of the actuation cylinder results in pivoting movement of the lifting arm 20 with respect to the movable base member 6.

As shown in these figures, a first end of the actuation cylinder 45 is pivotably affixed, via a bracket 49, to the movable base member 6 at a location spaced from the shaft 28'. A free end of the piston 47 is pivotably coupled to a bracket 51 that is fixedly secured to the first end 22 of the lifting arm 20, at a location spaced from the rotational axis defined by shaft 28'. Although the ends of the piston 47 and the cylinder 45 are respectively coupled to the lifting arm 20 and the movable base member 6 by the brackets 49, 51 and pins, it is to be understood that a variety of other similar-type connections would be readily apparent to those skilled in the art. It should be simply understood that adjusting the pressure within the actuation cylinder 45 causes the piston 47 to slide in or out of the cylinder 45 thereby either increasing or decreasing an overall length of the piston/cylinder arrangement and thus causing the lifting arm 20 to rotate or pivot with respect to the movable base member 6. The first actuator is coupled to and controlled by the control panel CP. As is conventional in the art, the actuation cylinder 45 is coupled to either a pneumatic or a hydraulic pressure source (not shown). The piston/cylinder arrangement is located in a fully extended position in FIG. 13C and in a fully retracted position in FIG. 13F. The control panel CP controls which side of the piston 47 is supplied with fluid in order to control operation of the actuation cylinder 45.

Figure 14A:
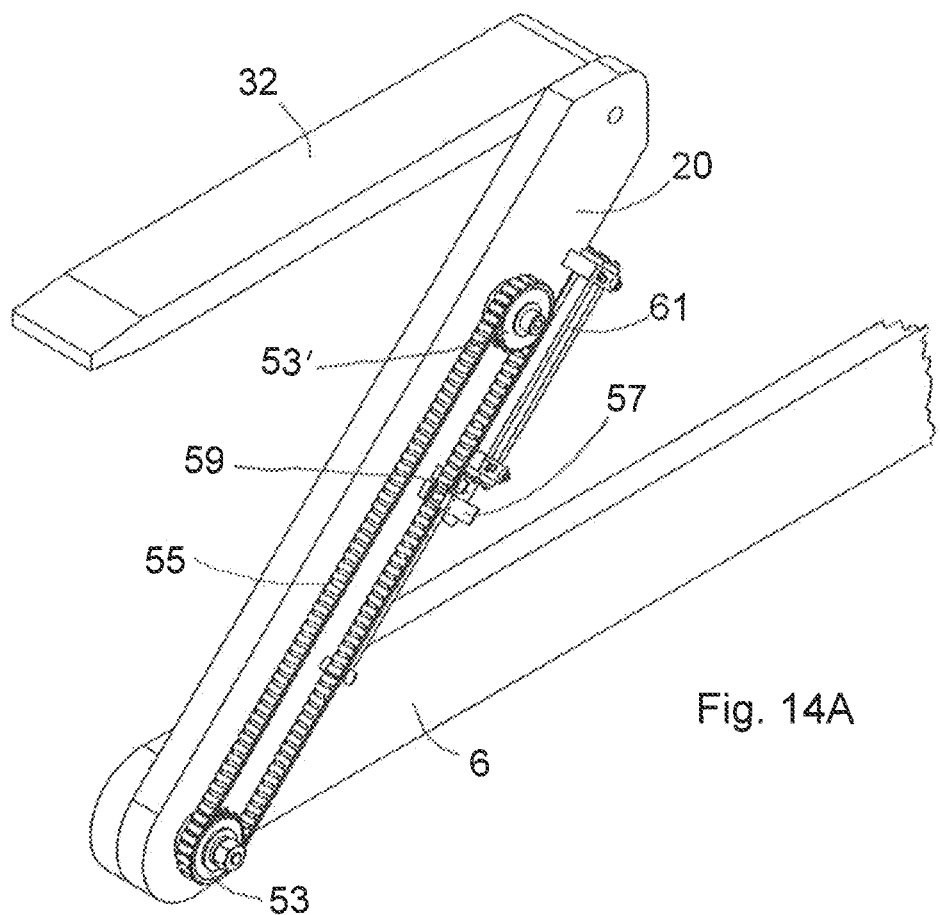
FIGS. 14A-14D, respectively, are top, front, right perspective, bottom, front, right perspective, top plan and side elevational views of a further mechanism for rotating the support arm relative to the lifting arm of the electric/hydraulic loading/unloading device, while FIGS. 14E-14J, respectively, are side elevational views showing the range of movement of the electric/hydraulic loading/unloading device of FIGS. 14A-14D.
Figure 14B:
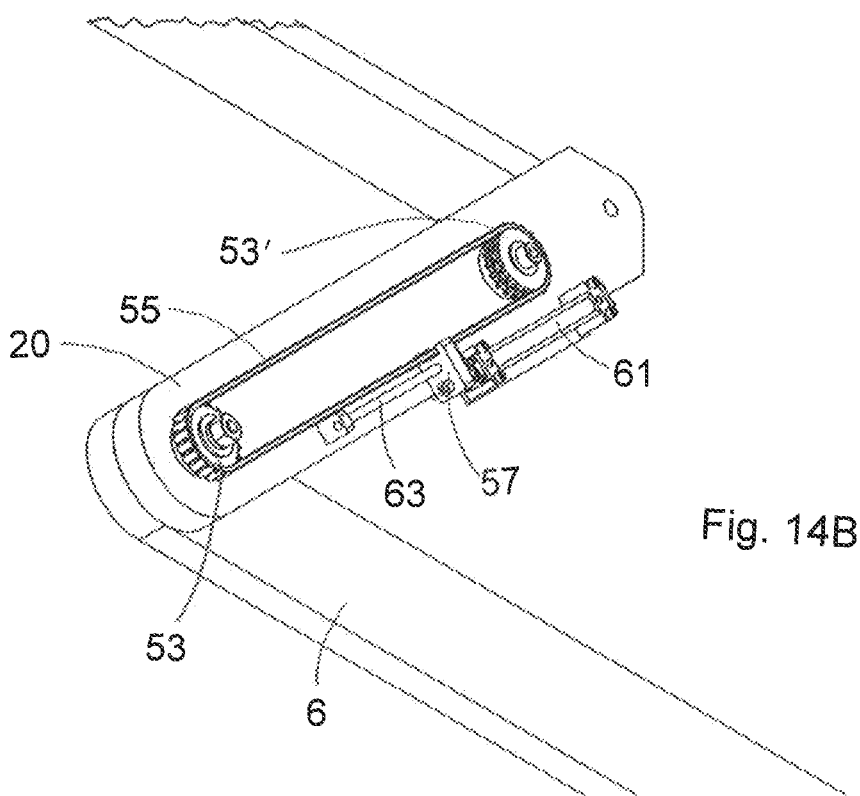
Figure 14C:
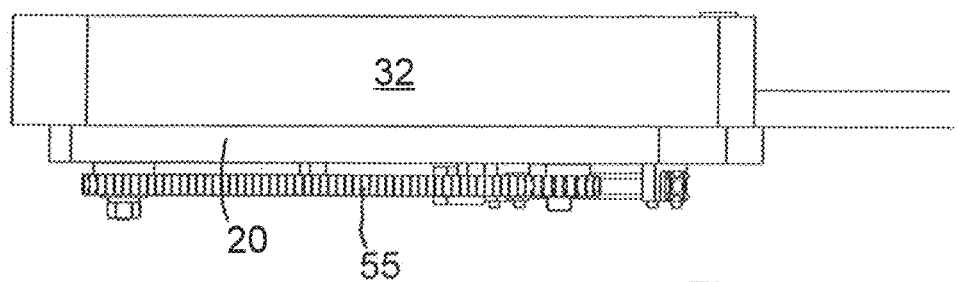
Figure 14D:
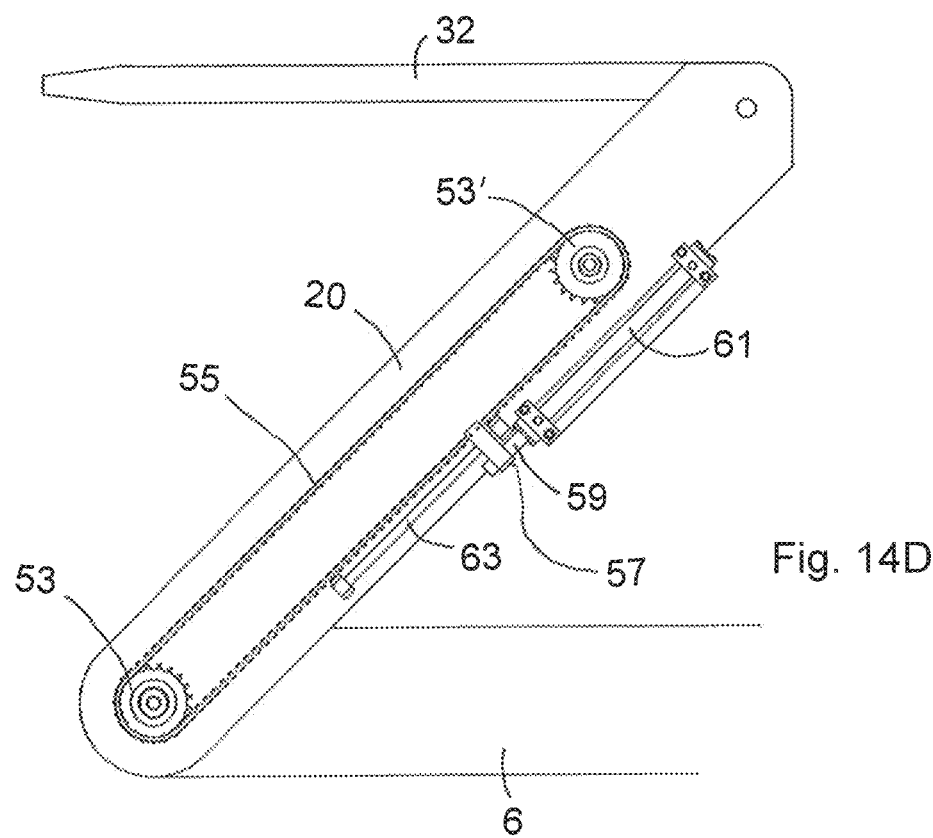

A still further variation by which the lifting arm 20 can be rotated with respect to the movable base member 6 is shown in FIGS. 14A-14J. It is to be appreciated that this variation is quite similar to gear/chain arrangements discussed above and includes two gears 53, 53' and a mating timing belt or chain 55. The two gears 53, 53' are coupled to one another by the chain 55 such that rotation of the chain 55 correspondingly causes rotation of both of the gears 53', 53, and vice versa. A coupling bracket 57 is securely clamped or otherwise fixed to a section of the chain 55 at a central location between the two gears 53, 53'. A piston 59 of a piston/cylinder arrangement is connected, via the coupling bracket 57, to the chain 55, while the actuation cylinder 61 is fixedly secured to the lifting arm 20. Like the piston/cylinder arrangement discussed above, adjustment of the pressure within the actuation cylinder 61 causes the piston 59 to slide in or out of the cylinder 61 thereby either increasing or decreasing an overall length of the piston/cylinder arrangement. The change in the length of the piston/cylinder arrangement causes the chain 55 to be correspondingly driven with respect to the piston/cylinder arrangement and thereby causes the two gears 53, 53' to correspondingly rotate about their respective axes. In a manner similar described above, the gear 53 is supported by a shaft such that rotation of the gear 53 causes the lifting arm 20 to rotate with respect to the movable base member 6. The cylinder 61 is coupled in a known manner to either a pneumatic or a hydraulic pressure source S (not shown here) and to the control panel CP (not shown here). The control panel CP controllably adjusts the pressure supplied to the actuation cylinder 61 for moving the piston/cylinder arrangement between a fully extended position, as shown in FIG. 14E, and a fully retracted position, as shown in FIG. 14J, and thereby adjusts the rotational position of the lifting arm 20 with respect to the movable base member 6.

It is beneficial for the gear/chain arrangement and piston/cylinder arrangement to be used in combination with a stabilizing bar or rod 63. The stabilizing bar 63 is fixedly secured to the lifting arm 20 and aligned so as to extend substantially parallel to both the piston/cylinder arrangement and the chain 55. The coupling bracket 57 is slidably coupled to the stabilizing bar or rod 63 so as to ensure proper alignment of the coupling bracket 57 and the chain 55 in relation to the piston/cylinder arrangement and prevent unwanted lateral movement therebetween regardless of the orientation of the lifting arm 20.

Figure 15A:
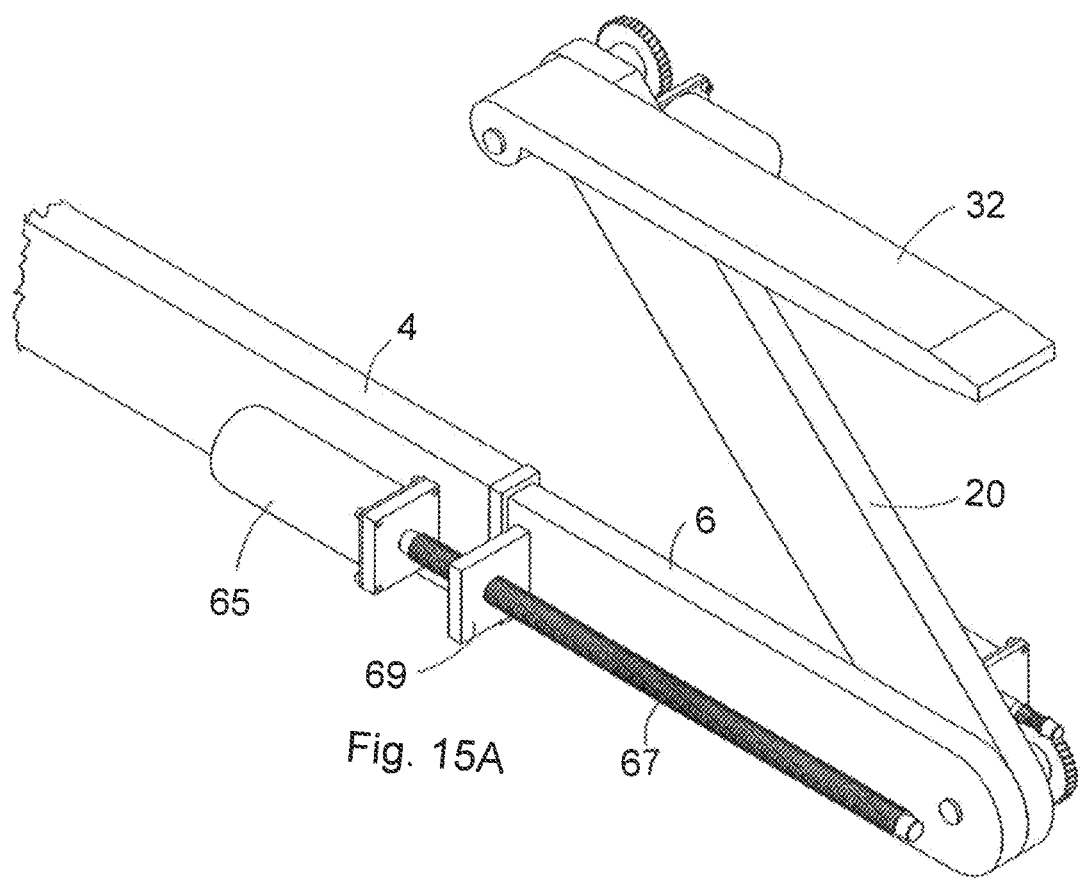
Figure 15B:
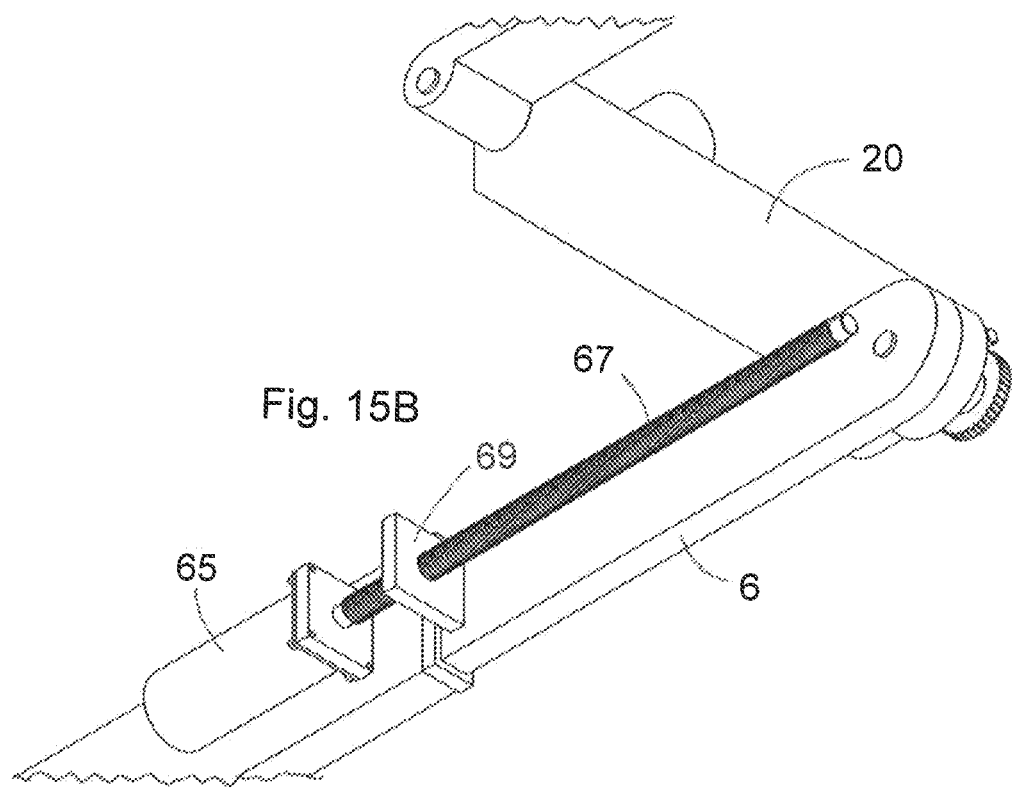
Figure 15C:
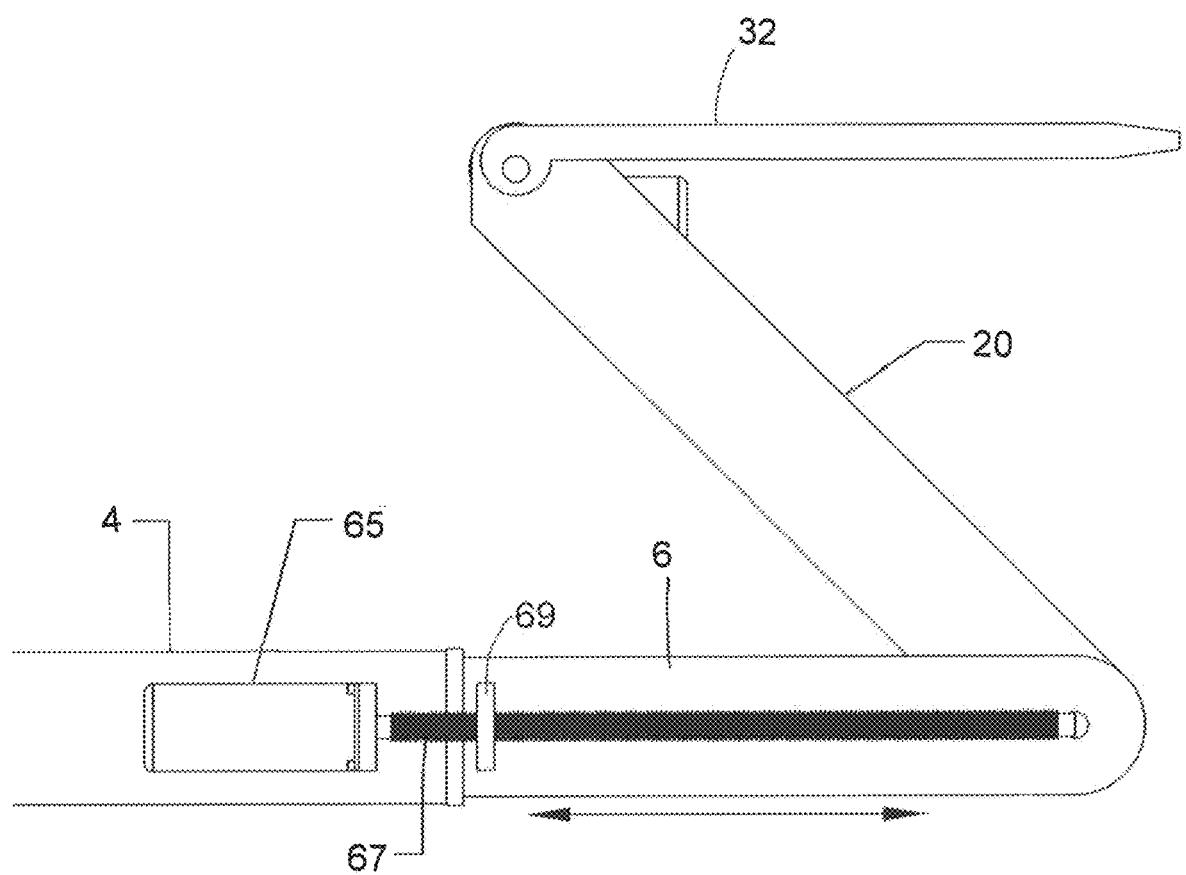
FIG. 15C is a side elevational view of FIGS. 15A and 15B.

As shown in FIGS. 15A-15C, a leadscrew interconnects and couples the fixed base member 4 to the movable base member 6 and thereby facilitates control of the relative sliding movement between these two components in the desired direction. As shown in these Figures, the first electric or hydraulic motor or drive 65 is secured to the fixed base member 4 such that a threaded drive shaft 67 projects from the motor or drive 65 parallel to the movable base member 6. A fixed plate 69 is secured, e.g., by welding, to an intermediate section of the movable base member 6. The fixed plate 69 extends generally normal to the movable base member 6 and has a threaded throughbore that is coaxially aligned with and threadedly engages with the threaded drive shaft 67 of the motor or drive 65. The engagement between the threaded drive shaft 67 and the threaded throughbore of the fixed plate 69 forms a leadscrew connection between the fixed base member 4 and the movable base member 6.

The first electric or hydraulic motor or drive 65 is connected to the control panel CP so that either a hydraulic or electrical energy supply S (not shown here) can control operation of the motor or drive 65. Actuation of the motor or drive 65 causes the threaded drive shaft 67 to rotate and this, in turn, facilitates axial movement of the movable base member 6 with respect to the fixed base member 4. The movable base member 6 can be moved between a fully retracted position, as shown in FIG. 15C, in which the first end 8 of the movable base member 6 is generally accommodated within the fixed base member 4, to a fully extended position (not shown), in which the movable base member 6 extends out of the fixed base member 4. It is to be appreciated, however, that the movable base member 6 never completely extends out of the fixed base member 4 because the second end 8 of the movable base member 6 must always be at least sufficiently supported by the fixed base member 4 so that the load, supported by the movable base member 6, can be transferred to the fixed base member 4 and the frame or the support structure.

FIGS. 16A through 16H show another application of the electric/hydraulic loading/unloading device 2 according to the present invention. According to this application, first and second opposed pairs of the electric/hydraulic loading/unloading devices 2 are supported by the support structure of the vehicle V on opposite lateral sides of a supporting bed or frame 73, e.g., on a utility vehicle or a delivery truck V. A right side pair of fixed base members R, R' are aligned so as to be substantially parallel with respect to one another and a left side pair of fixed base members L, L' are also aligned so as to be substantially parallel with respect to one another.

The movable base members 6 are aligned with respect to one another such that each right side movable base member 6 of the right side pairs R, R' extends in an opposite direction from a respective left side movable base member 6. Due to this arrangement, it is possible for two movable base members 6, one of the first pair L, L' and one of the second pair R, R' to be supported by a single fixed base member 4. That is to say, a movable base member 6 could be received within each of the opposed left and right ends of a sufficiently long or sufficiently wide single fixed base member 4. When only one fixed base member 4 supports two movable base members 6, it is possible for the two pistons, each one of which biases one of the two movable base members 6, to be mounted either on one side of the fixed base member 4 or on opposite sides of the fixed base member 4. Each of the four electric/hydraulic loading/unloading devices of this application includes a support arm platform 62. As the support arm platforms 62 are substantially identical to the support arm platforms discussed above with reference to FIGS. 6A-6G, a further detailed description concerning the same is not being provided.

According to this embodiment, however, an upper surface of each one of the support arm platforms 62 supports a storage container 71, such as a toolbox, a utility chest or the like. When each one of the electric/hydraulic loading/unloading devices 2 is in its inactive stored position, this embodiment facilitates each one of the storage containers 71 to be supported on a support surface 73, e.g., on the flat bed of the utility vehicle V in the stored condition, e.g., during travel to and from a work or delivery site. When use or access to the storage container 71 is needed or desired, the respective electric/hydraulic loading/unloading device(s) 2 is actuated in order to lift and lower the respective storage container 71 (possibly onto the ground), allowing easy access to the items, such as tools, components, materials, etc., stored within the storage container 71.

Figure 16A:
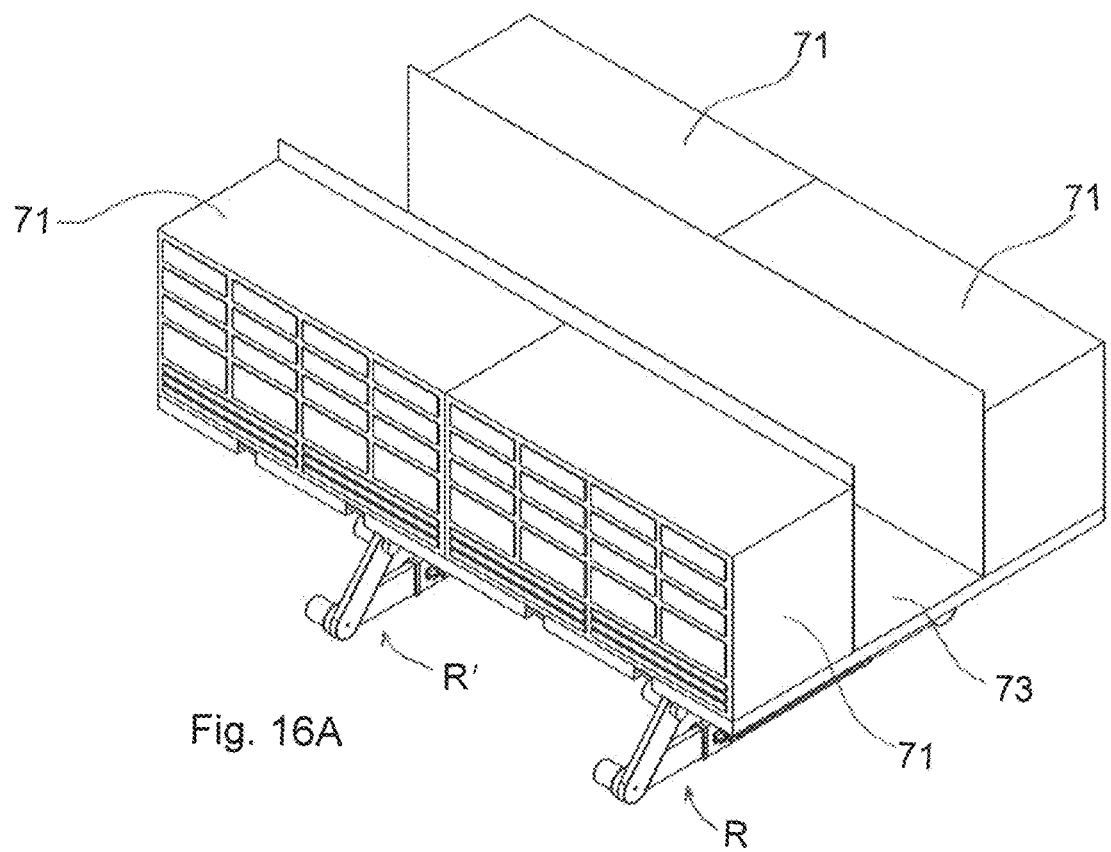
FIGS. 16A and 16B respectively are top, front, left perspective and bottom, front, left perspective views showing an application of two pairs of the electric/hydraulic loading/unloading device according to the invention, FIGS. 16C and 16D respectively are top, front, left perspective and bottom, front, left perspective views showing activation of one of the pair of electric/hydraulic loading/unloading devices.
Figure 16B:
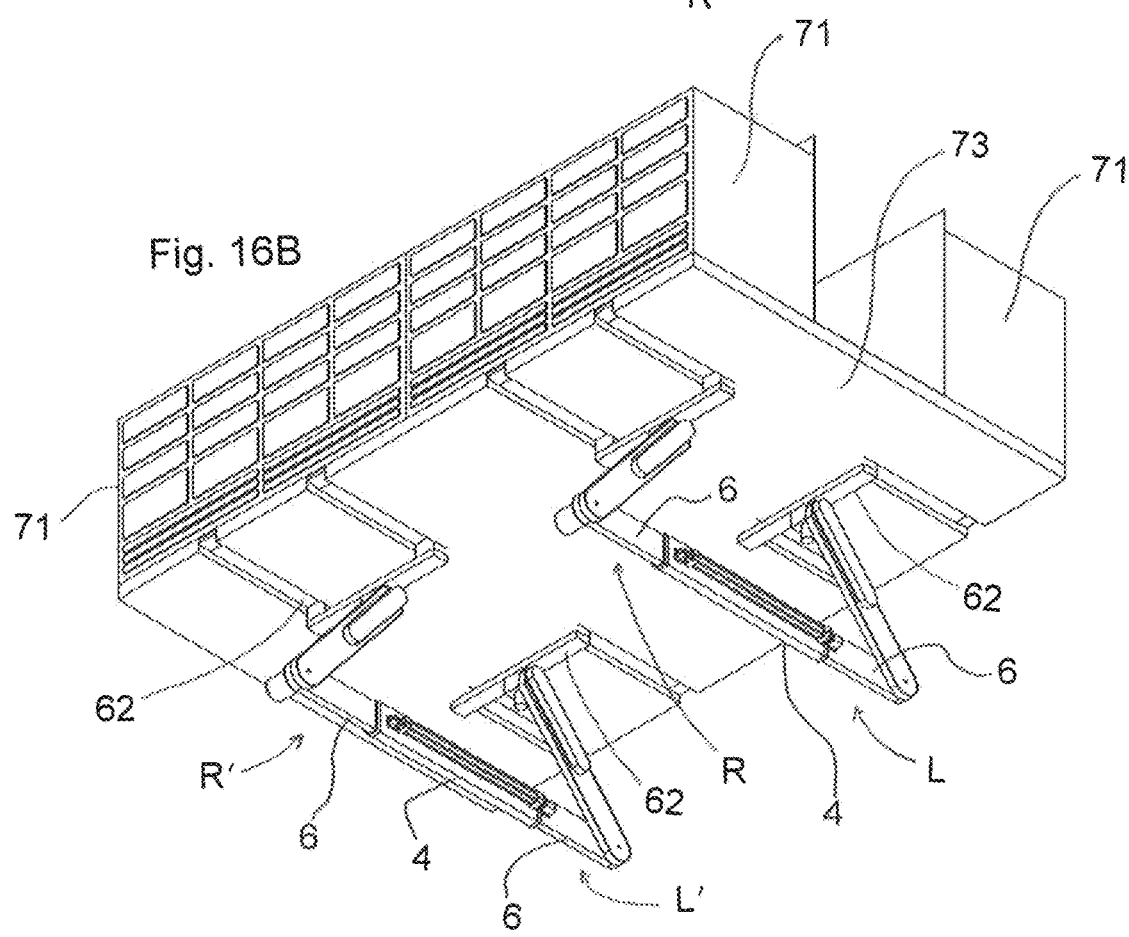
Figure 16C:
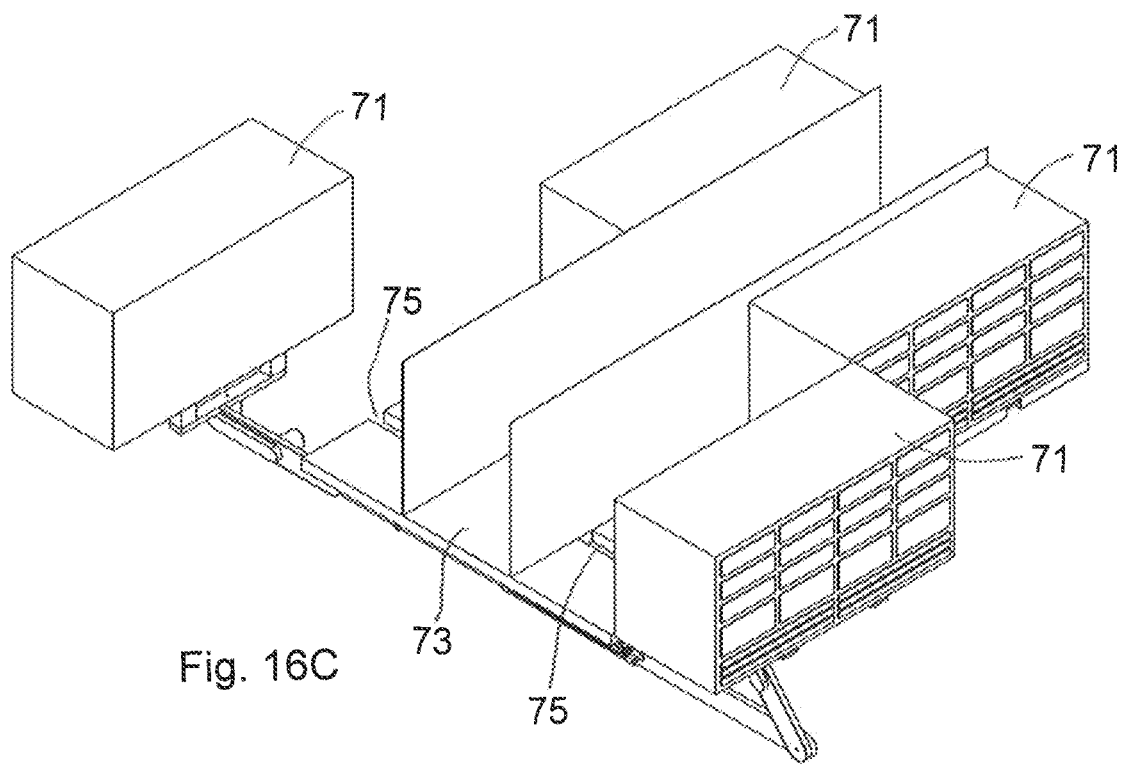
FIGS. 16E-16H are each diagrammatic side elevational views showing raising one storage container from a lowered position to a stowed position on a surface or bed of the vehicle.
Figure 16D:
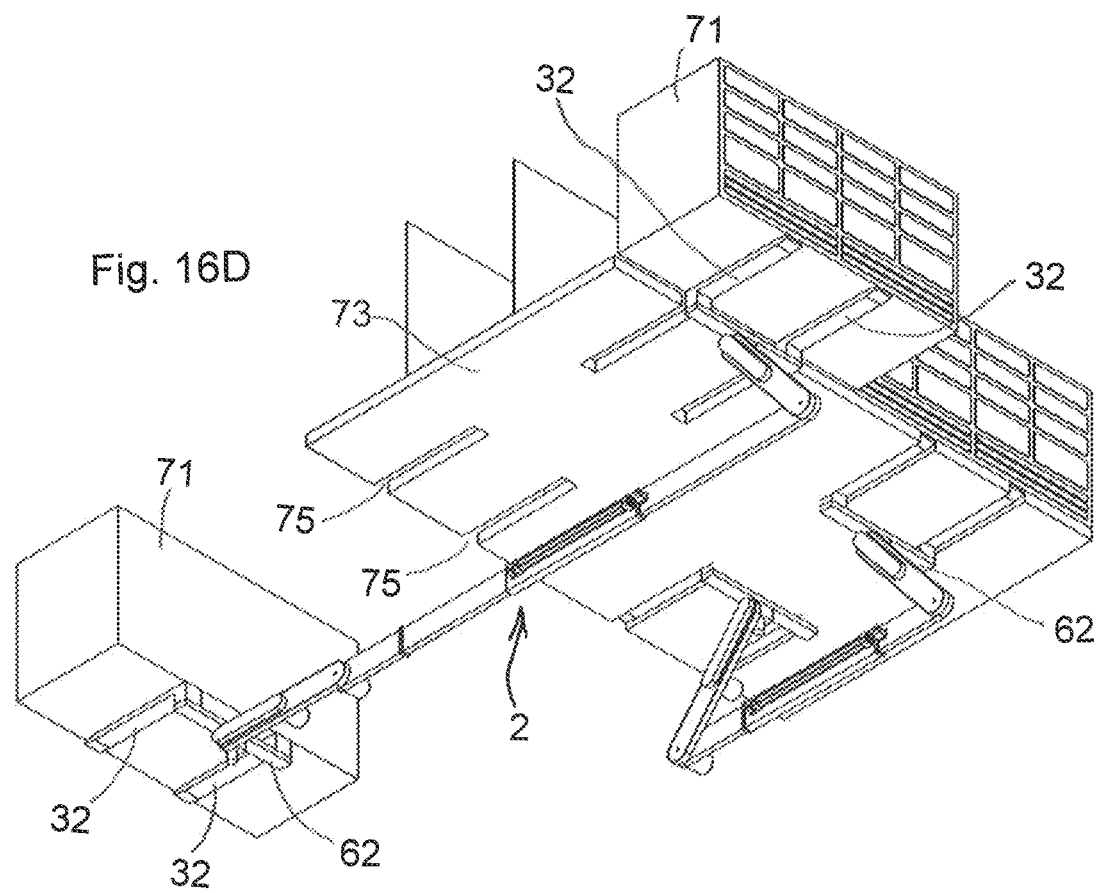
Figure 16E:
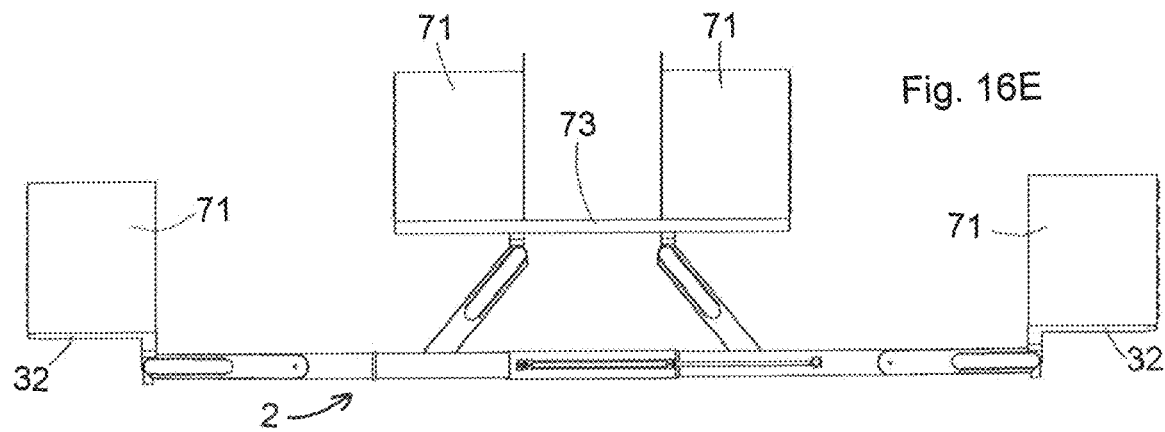
Figure 16F:
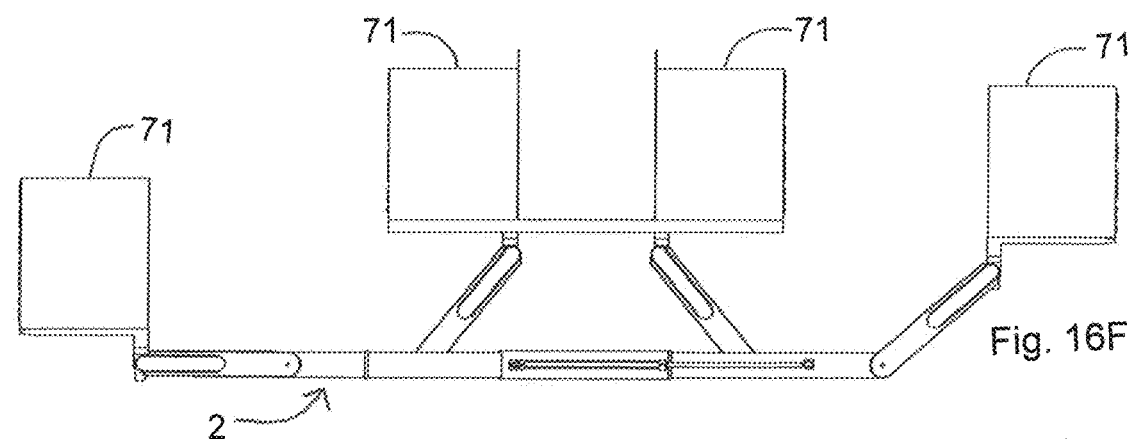
Figure 16G:
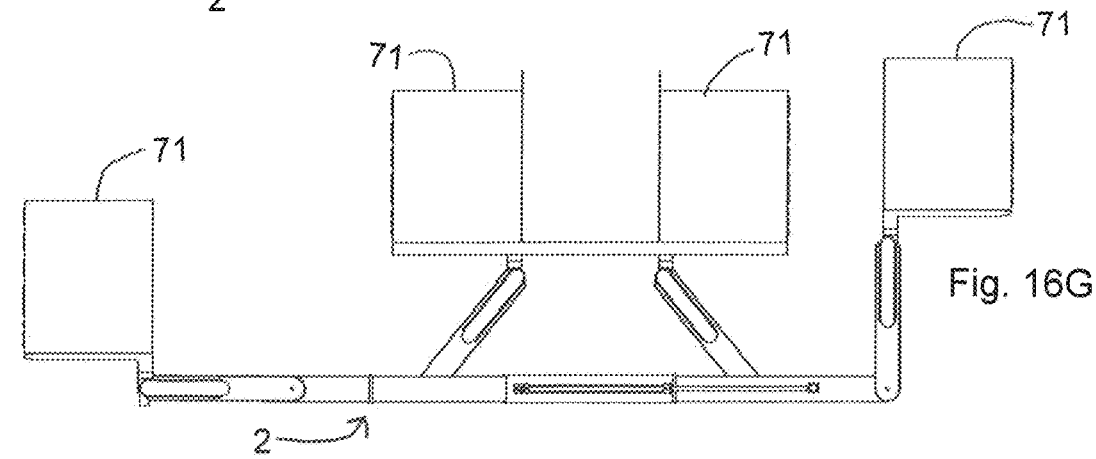
Figure 16H:
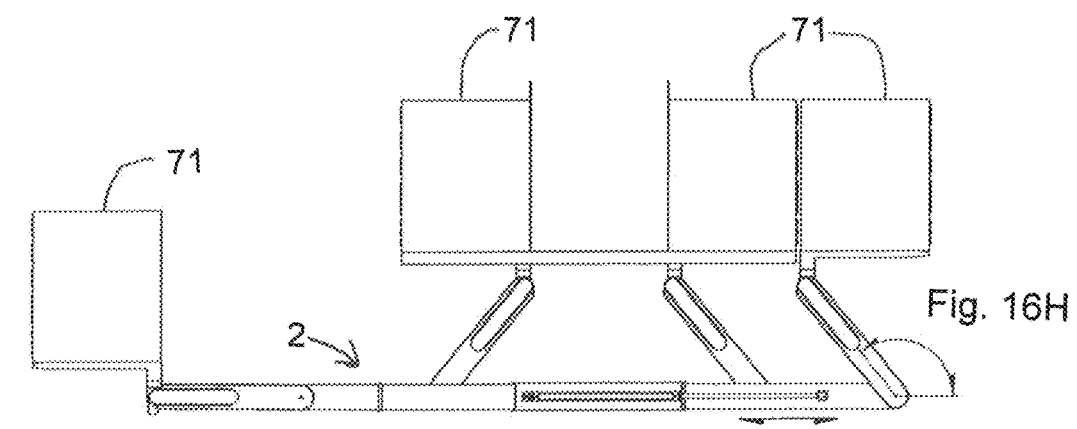

As illustrated in FIGS. 16A-16D, the support surface 73, e.g., the flat bed of the utility vehicle V, has four pairs of laterally extending slots 75 and each pair of slots 75 is arranged to receive the support arms of one of the support arm platforms 62, when the respective storage containers 71 are supported in their stored/travel positions on the support surface 73, as shown in FIGS. 16A and 16B. FIGS. 16A-16H illustrate the range of operation and movement of the electric/hydraulic loading/unloading devices 2 from the stored position of the storage containers 71 (see FIGS. 16A and 16B) to the extended lowered position of the storage containers (see FIGS. 16C-16H).

Depending upon the load to be delivered or retrieved at a desired site, it may be desirable for the utility vehicle V, which utilize the electric/hydraulic loading/unloading devices 2 as described above, to use one or more pairs of outriggers 77 (see FIG. 17A) and/or vertical stabilizers 79 (see FIGS. 17B and 17C), as generally shown in FIGS. 17A-17D. Such outriggers 77 and/or vertical stabilizers 79 assist with increasing the foot print of the vehicle and thereby add stability to the vehicle V during loading and unloading of a load so as to prevent the utility vehicle V from tipping excessively, or possibly overturning, during use of the electric/hydraulic loading/unloading devices 2. The outriggers 77 or vertical stabilizers 79 are extendable and retractable, in a conventional manner, and are normally only deployed when the vehicle is either loading or unloading a load. As such, the outriggers 77 and the vertical stabilizers 79, as well as their use is common and well known in the field of utility vehicles V, and a further detail discussion of the same is not believed to be necessary.

Figure 18A:
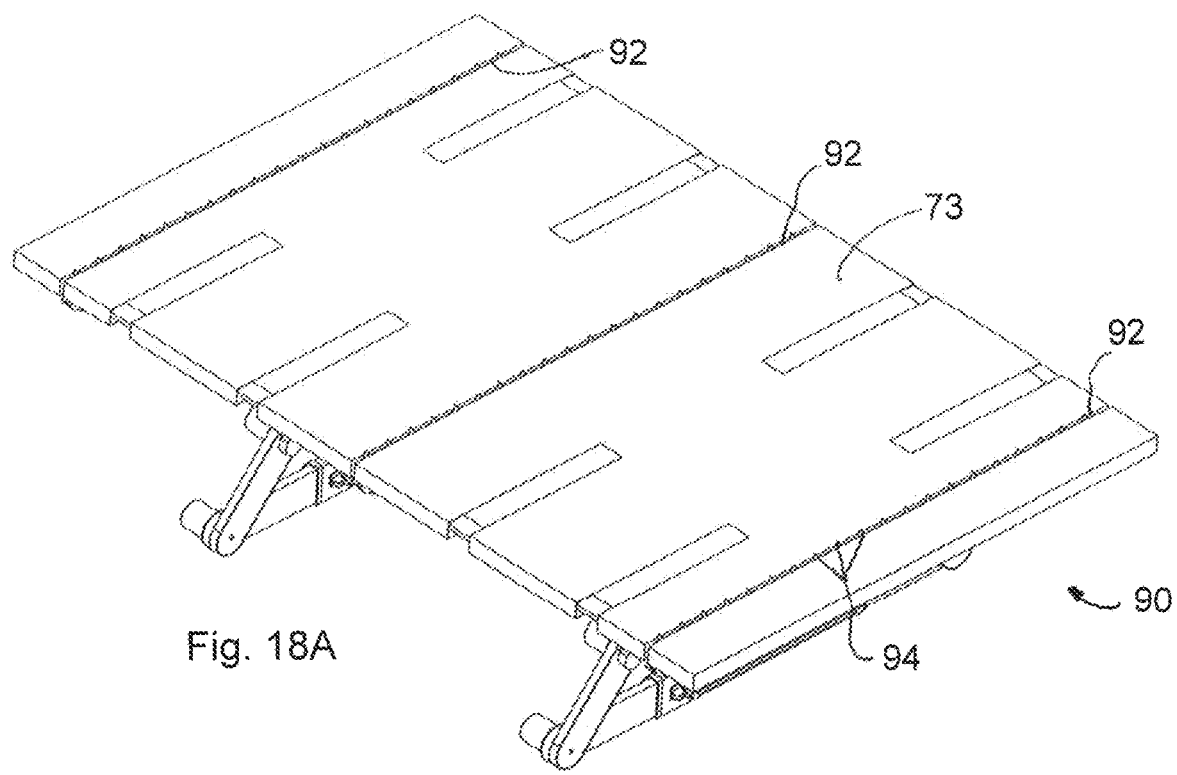
Figure 18B:
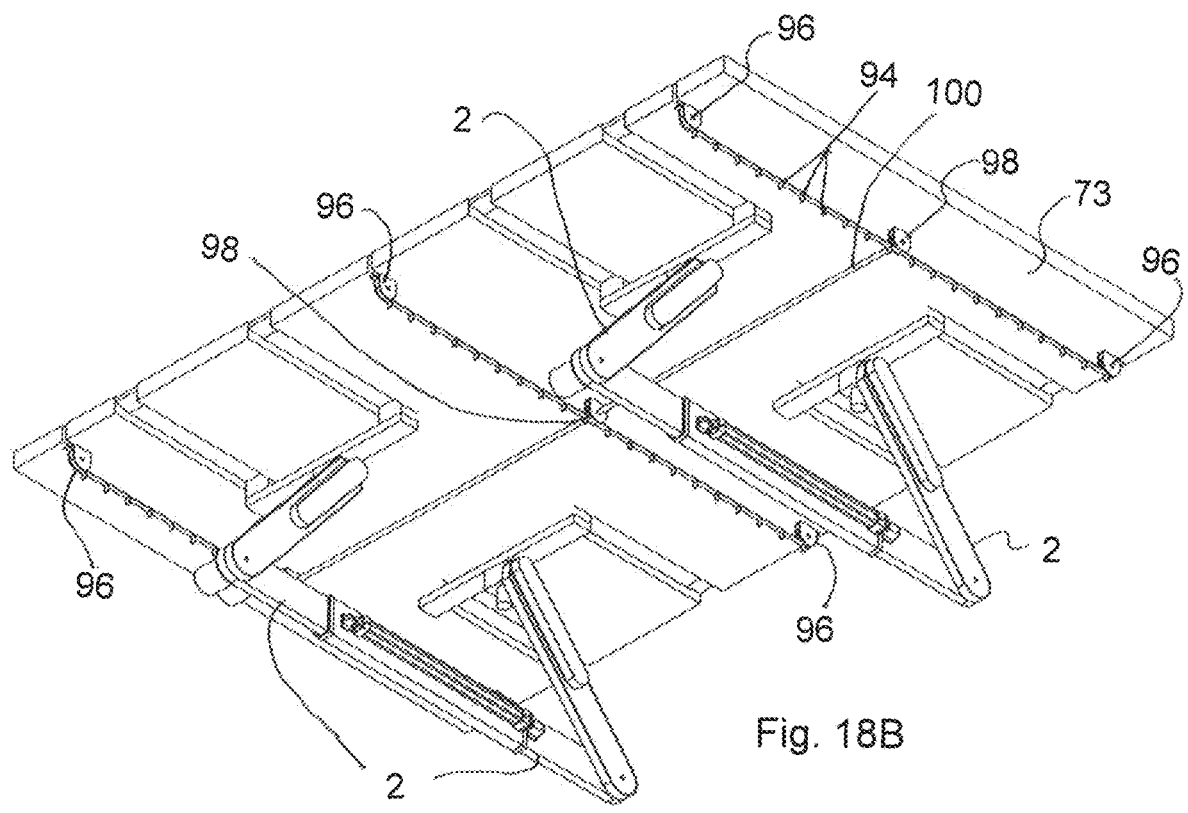
FIG. 18B is a diagrammatic left, rear, bottom plan view of a support surface or bed of a delivery vehicle with a conveying loading/unloading device which assists with conveying items to be delivered from one side of the support surface or bed of the delivery vehicle to the other.

As shown in FIG. 18A and FIG. 18B, the support bed or surface 73 of the delivery vehicle V may be equipped with a lateral (or possibly a longitudinal) conveying mechanism, generally designated as 90, which assists with conveying the supported lumber, steel, pallets, objects, items, etc. (not shown) to be delivered from an initial loaded position on the support bed or surface 73 toward either a central portion of the support bed or surface 73 or toward one of the opposite lateral edges, sides or ends of the support bed or surface 73. According to this embodiment, the conveying mechanism 90 comprises a plurality of endless belts, e.g., three endless belts 92, which are each partially recessed into the top surface of the support bed or surface 73 and are typically equally, but not necessarily, spaced apart from one another. Each one of the three endless belts 92 extends parallel to one another along but slightly recessed in the top surface of the support bed or surface 73. The first endless belt 92 is located adjacent a front leading end of the support bed or surface 73, the second endless belt 92 is located adjacent a rear trailing end of the support bed or surface 73, while the third endless belt 92 is located between the first and the second endless belts, e.g., in a middle area.

An outwardly facing surface of the each one of the endless belts 92 has a plurality of spaced apart protrusions or other gripper features 94 with assist with gripping the lumber, steel, pallets, objects, items, etc., which is supported by the top surface of the support bed or surface 73. Each one of the endless belts 92 further comprises spaced apart conventional first and second belt return wheels 96 which are each rotatably supported along opposite lateral edges, sides or ends of the support bed or surface 73. The respective endless belt 92 is wrapped around and supported by the first and second belt return wheels 96. A respective centrally located drive wheel 98 also supports and engages with each one of the respective endless belts 92. The drive wheel 98 is driven by a conventional belt motor or drive (not shown), e.g., either an electric or a hydraulic motor or drive, to facilitate simultaneously driving all three of the endless belts 92 in either a first direction, or a second opposite direction, and thereby assist with conveying lumber, steel, pallets, objects, items, etc., to be delivered in a desired direction across the support bed or surface 73.

A single bed motor or drive can be connected, by a single elongate shaft 100, to each one of the three drive gear wheels 98 to facilitate simultaneous driving of all three of the endless belts 92 in unison with one another in either a first direction or an opposite second direction. Alternatively, each one of the three drive gear wheels 98 can be driven by a separate bed motor or drive to facilitate driving each one of the endless belts 92 independently and separately from one another. Alternatively, a conventional bed motor(s) or drive(s) may drive either the first and/or the second return gear wheel(s) 96, instead of the drive gear wheel 98, without departing from the spirit and scope of the present invention.

FIGS. 19A-19F illustrate a further variation by which the lifting arm 20 can be pivoted with respect to the movable base member 6. According to this embodiment, the first end 22 of the lifting arm 20 is rotatably or pivotally coupled to the first end 12 of the movable base member 6 by a shaft 28' which facilitates relative rotation and defines a rotational axis. One or more bearings may be located between the shaft 28' and the movable base member 6 and/or the lifting arm 20 to facilitate relative movement or rotation. A movable hinge 102 is connected to and supported by the shaft 28'. The movable hinge 102 is able to rotate relative to the shaft 28', the movable base member 6 and the lifting arm 20. Since the movable hinge 102 will be subjected to significant force, as will become apparent from the following discussion, the movable hinge 102 typically comprises steel, or some other strong, durably and non-deformable material.

As shown, a first end of a first actuation cylinder 45 is pivotably affixed, via a first bracket 49', to the movable base member 6 at a location spaced from the shaft 28'. A free end of the piston of the first actuation cylinder 45 is pivotably coupled, e.g., by a non-deformable (steel) pin (not numbered), to a first surface of the movable hinge 102 at a location spaced from the shaft 28'. In addition, a free end of the piston of the second actuation cylinder 45' is pivotably coupled, e.g., by the same or another non-deformable (steel) pin (not numbered), to a second surface of the movable hinge 102 at a location spaced from the shaft 28', while an opposite end of the second actuation cylinder 45' is pivotably coupled to a second bracket 49" which secured to the lifting arm 20 at a location spaced from the shaft 28'. It is to be understood and appreciated that a variety of other type of known connections may be utilized to connect the first and the second actuation cylinders 45, 45' to the movable hinge 102, the movable base member 6 and the lifting arm 20, without departing from the spirit and scope of the present invention.

Each of the ends of the first and the second actuation cylinders 45, 45' are respectively coupled to a hydraulic or pneumatic source S to facilitate supplying pressurized fluid thereto. In addition, both the first and the second actuation cylinders 45, 45' are coupled to the control panel CP which facilitates operation and control of the supply of pressurized fluid thereto. When pivoting or rotation of the lifting arm 20 relative to the movable base member 6 is desired, the control panel CP actuates either one or both of the first and the second actuation cylinders 45, 45'. As an overall length of the first and/or the second actuation cylinders 45, 45' either increases or decreases (see FIGS. 19A-19F), the orientation of the lifting arm 20, relative to the movable base member 6, is correspondingly altered.

Figure 19A:
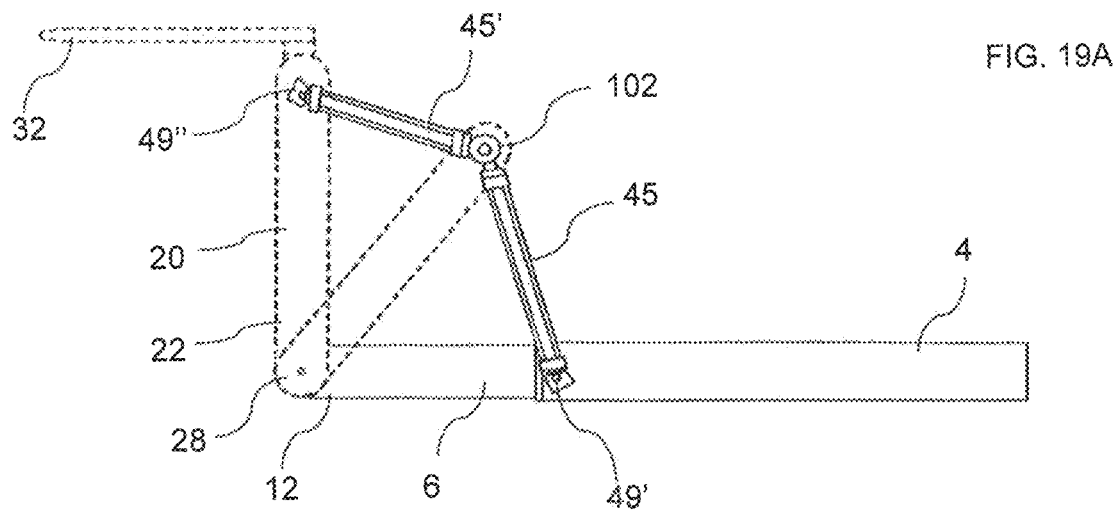
FIG. 19A is an enlarged diagrammatic side elevational view showing a double cylinder/piston arrangement for pivoting or rotating the lifting arm relative to the movable base member while FIGS. 19B-19F diagrammatically show the range of movement of the electric/hydraulic loading/unloading device according to this embodiment.
Figure 19B:
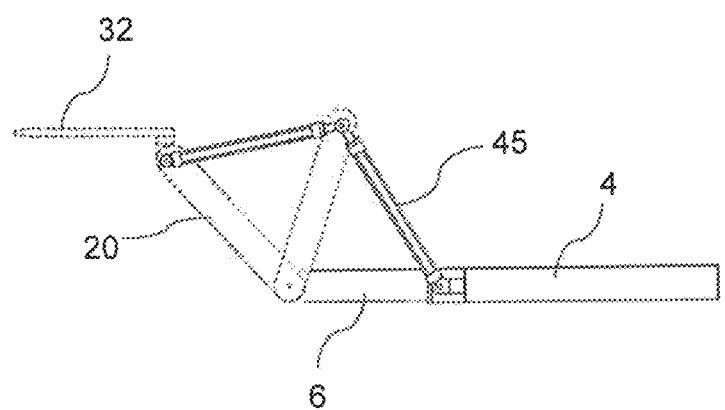
Figure 19C:
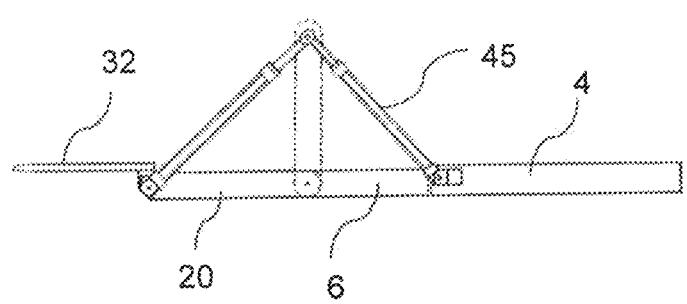
Figure 19D:
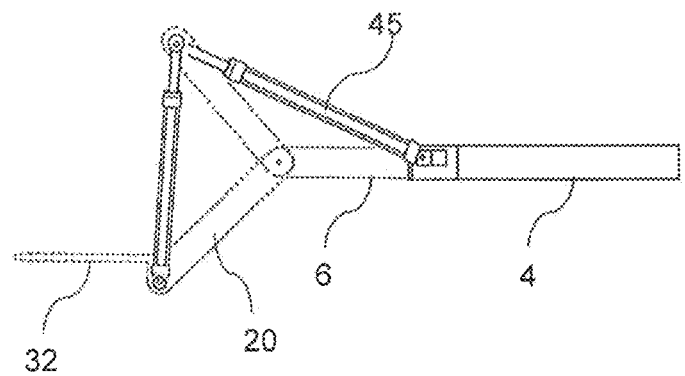
Figure 19E:
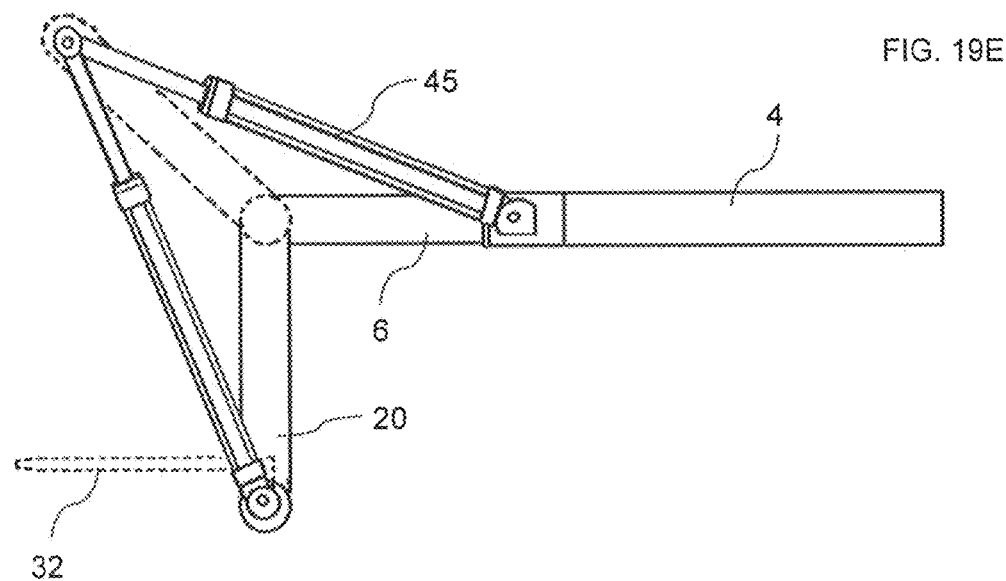
Figure 19F:
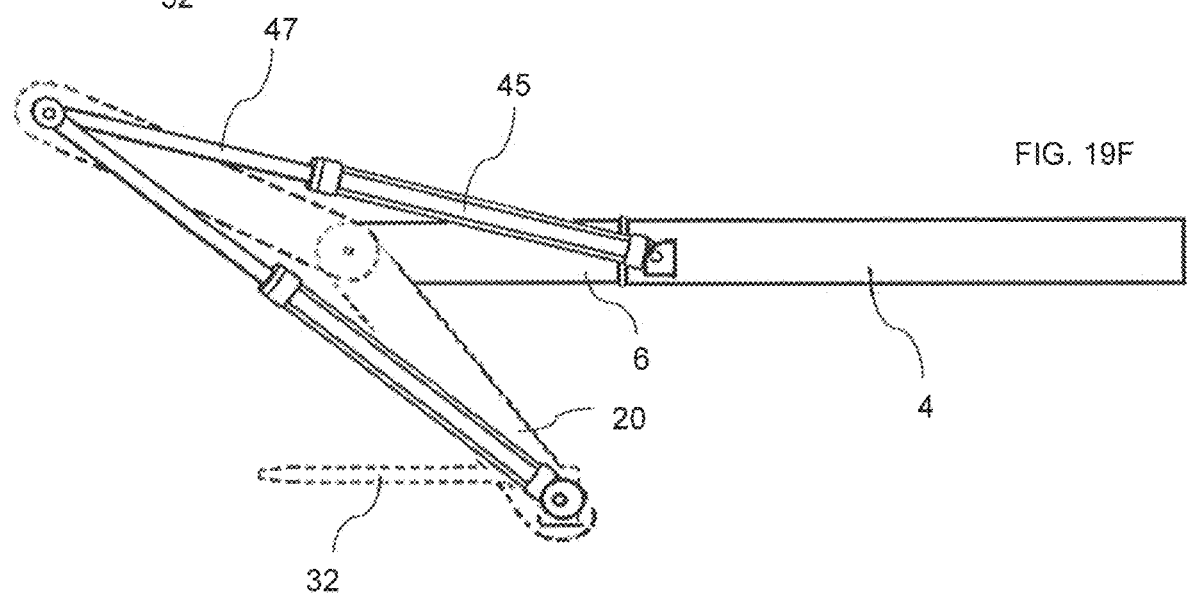

Due to the significant loads that may be experienced, preferably the first and the second actuation cylinders 45, 45' substantially lie in a plane. This ensures that the forces transmitted by the first and the second actuation cylinders 45, 45' (as well as any additional actuation cylinders) are transferred directly between the movable base member 6 and the lifting arm 20 to alter their positions relative to one another. When both the first and the second actuation cylinders 45, 45' are in their minimum length positions, the lifting arm 20 is generally in a retracted position as shown in FIG. 19A. When both the first and the second actuation cylinders 45, 45' are in their maximum length positions, the lifting arm 20 is generally in an extended/reticulated position as shown in FIG. 19F. That is, FIGS. 19B-19E show a variety of achievable intermediate positions between the fully extended/reticulated position and the retracted position of the electric/hydraulic loading/unloading device 2.

While the above description merely refers to first and second actuation cylinders 45, 45', it is to be appreciated that three or more actuation cylinders may be utilized in combination with one another. This will provide the two rotatably connected components with an increased or greater range of movement and/or additional power. In addition, it is to be appreciated that the support arm 32 and/or the support arm platform 62 may also be connected to the lifting arm 20 by one or more movable hinges and two or more actuation cylinders without departing from the spirit and scope of the present invention.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

I claim:

1. A loading/unloading device for attachment to a delivery vehicle to facilitate at least one of loading and unloading of the delivery vehicle, the loading/unloading device comprising: a fixed base member being attachable to the delivery vehicle; a movable base member being supported by and being axially movable, by a first drive, with respect to the fixed base member; a first end of a lifting arm being pivotably connected to a first end of the movable base member, and the lifting arm being rotatably connected with respect to the movable base member by a second drive to facilitate pivoting movement of the lifting arm relative to the movable base member; and a first end of a support arm being rotatably connected to a second end of the lifting arm to facilitate maintaining the support arm parallel to the movable base member during pivoting movement of the lifting arm, and the support arm being rotatably mounted with respect to the lifting arm to facilitate at least one of loading and unloading of the delivery vehicle; the support arm being coupled to the lifting arm by a bracket, a further drive being fixed to one of the support arm and the bracket, the further drive having a rotatable shaft with a free end that is connected to the other of the support arm and the bracket so as to provide relative rotation of the support arm with respect to the bracket.

2. The loading/unloading device according to claim 1, wherein the first drive comprises one of a pneumatic piston, a hydraulic piston, and an electric or hydraulic motor with a leadscrew which facilitates movement of the movable base member relative to the fixed base member between a fully retracted position and a fully extended position, and vice versa.

3. The loading/unloading device according to claim 2, wherein the second drive is coupled the first end of the support arm to facilitate pivoting of the lifting arm with respect to the movable base member, and the second drive, during operation, is coupled to the support arm so as to correspondingly pivot the support arm, with respect to the lifting arm, so that the support arm remains parallel to the movable base member during pivoting movement of the lifting arm.

4. The loading/unloading device according to claim 2, wherein the second drive has a rotatable shaft which extends through a respective through bore formed in each of the first end of the lifting arm and the first end of the movable base member, the second drive is fixedly connected to one of the lifting arm and the movable base member while the other of the lifting arm and the movable base member is fixedly connected to the rotatable shaft of the second drive.

5. The loading/unloading device according to claim 4, wherein a first gear is secured to the rotatable shaft of the second drive and the first gear rotates with the rotatable shaft, a driven shaft is fixed to the support arm, the driven shaft extends through a through bore formed in the second end of the lifting arm, a free end of the driven shaft supports a second gear, and a chain links the first gear with the second gear to facilitate the second drive maintaining the support arm parallel to the movable base member during pivoting movement of the lifting arm.

6. The loading/unloading device according to claim 5, wherein the support arm is coupled to the lifting arm by the bracket which supports the driven shaft, the driven shaft is fixedly connected to the bracket and a free end of the driven shaft supports the second gear, a through bore is formed in the bracket substantially normal to the driven shaft.

7. The loading/unloading device according to claim 1, wherein the support arm is a C-shaped support arm platform, and the further drive facilitates rotation of the C-shaped support arm platform relative to the bracket.

8. The loading/unloading device according to claim 1, wherein a third drive couples the first end of the support arm to the second end of the lifting arm, and the third drive controls pivoting motion of the support arm relative to the lifting arm so that as the lifting arm pivots with respect to the movable base member, the second drive also correspondingly pivots the support arm with respect to the lifting arm so that the support arm remains parallel to the movable base member.

9. The loading/unloading device according to claim 1, wherein a driven shaft is fixed to the support arm and the driven shaft extends through a through bore formed in the second end of the lifting arm, a free end of the driven shaft supports a second gear, a rotatable shaft of a third drive extends through a third through bore formed in the lifting arm, the third drive is secured to the lifting arm while a free end of the rotatable shaft of the third drive supports a first gear, and a chain links the first gear to the second gear to facilitate pivoting of the support arm relative to the lifting arm.

10. The loading/unloading device according to claim 1, wherein the fixed base member, the movable base member and the lifting arm are all supported by a rotatable support arm platform so as to rotate together in unison with one another relative to a support structure of the delivery vehicle and thereby provide an additional range of movement for the loading/unloading device.

11. The loading/unloading device according to claim 10, wherein the rotatable support arm platform includes a central shaft and a support structure of the delivery vehicle has a mating bore which receives and rotatably supports the central shaft, the fixed base member is secured to a bottom surface of the rotatable support arm platform, and an additional drive is supported by the support structure to facilitate rotation of the rotatable support arm platform relative to the support structure.

12. The loading/unloading device according to claim 1, wherein at least one of the pivotable connection between the first end of the movable base member and the first end of the lifting arm and of the pivotable connection between the second end of the lifting arm and the first end of the support arm has a worm drive which facilitates pivoting therebetween.

13. The loading/unloading device according to claim 1, wherein an external gearing is formed in an outer periphery of the first end of the lifting arm, and the second drive engages with the external gearing to facilitate pivoting of the lifting arm relative to the movable arm.

14. The loading/unloading device according to claim 1, wherein the second drive comprises an actuation cylinder which couples the first end of the movable base member to the first end of the lifting arm and pressurization of the actuation cylinder induces pivoting movement of the lifting arm with respect to the movable base member.

15. The loading/unloading device according to claim 1 in combination with the delivery vehicle, wherein a support bed or surface of the delivery vehicle is equipped with a conveying mechanism which assists with conveying a supported load along the support bed or surface, the conveying mechanism comprises at least one endless belt which extends along a portion of a top surface of the support bed or surface, the at least one endless belt wraps around a respective pair of opposed belt return wheels, and a belt drive facilitates driving the at least one endless belt in a desired rotational direction.

16. The loading/unloading device according to claim 1, wherein the delivery vehicle includes at least one of a pair of outriggers and a pair of vertical stabilizers which, when deployed, assist with increasing a foot print of the delivery vehicle and add stability to the delivery vehicle during loading and unloading of a load, and the at least one of a pair of outriggers and vertical stabilizers each have an deployed, extended position and a transportable retractable position.

17. The loading/unloading device according to claim 1, wherein a third drive couples the second end of the lifting arm to the first end of the support arm, and the third drive controls pivoting motion of the support arm about a pivot axis relative to the lifting arm so that as the lifting arm pivots with respect to the movable base member the support arm remains parallel to the movable base member, the rotatable shaft of the further drive rotating about a rotational axis that is at least substantially perpendicular to the pivot axis such that the support arm pivots in a horizontal plane and a vertical lane relative to the lifting arm.

18. The loading/unloading device according to claim 11, wherein each of the first, the second, the further and the additional drives is geared sufficiently low so as to provide precise control of desired rotational movement while still being sufficiently powerful enough to facilitate lifting a load supported by the support arm.

19. The loading/unloading device according to claim 18, wherein each of each of the first, the second, the further and the additional drives is coupled to a control panel which controls operation thereof.

20. The loading/unloading device according to claim 1, wherein a movable hinge is supported by the rotatable connection between the movable base member and the lifting arm; the second drive comprises at least first and second actuation cylinders, the first actuation cylinder couples the movable base member to the movable hinge while the second actuation cylinder couples the lifting arm to the movable hinge; and each one of the at least first and the second actuation cylinders is selectively actuable for altering a position of the lifting arm relative to the movable base member.

21. A method of at least one of load and unloading of a delivery vehicle with a loading/unloading device, the method comprising the steps of: fixedly securing a fixed base member to the delivery vehicle; supporting a movable base member so as to be axially movable relative to the fixed base member by a first drive; rotatably coupling a first end of a lifting arm, via a second drive, so as to be rotatable with respect to the movable base member; rotatably coupling a first end of a support arm, via a bracket, to a second end of the lifting arm to facilitate maintaining the support arm parallel to the movable base member during rotation of the lifting arm; and using the loading/unloading device to facilitate at least one of loading and unloading of the delivery vehicle, fixing a further drive to one of the support arm and the bracket, connecting an end of a rotatable shaft of the further drive to the other of the support arm and the bracket to provide relative rotation of the support arm with respect to the bracket.

* * * * *